United States Patent
Zittel et al.

(10) Patent No.: US 11,263,267 B1
(45) Date of Patent: Mar. 1, 2022

(54) APPARATUSES, METHODS, AND COMPUTER PROGRAM PRODUCTS FOR GENERATING INTERACTION VECTORS WITHIN A MULTI-COMPONENT SYSTEM

(71) Applicants: ATLASSIAN PTY LTD., Sydney (AU); ATLASSIAN, INC., San Francisco, CA (US)

(72) Inventors: Jascha-Alexander Stephan Zittel, Sydney (AU); Andrew John Freedman, Sydney (AU); Neil Dunbar, Sydney (AU); Sae Ra Kang, Sydney (AU); Luke Andrew Esther, Sydney (AU); Chris Jo Stivers, Mountain View, CA (US); Taylor Timothy Pechacek, Sydney (AU)

(73) Assignees: ATLASSIAN PTY LTD., Sydney (AU); ATLASSIAN, INC., San Francisco, CA (US)

( * ) Notice: Subject to any disclaimer, the term of this patent is extended or adjusted under 35 U.S.C. 154(b) by 0 days.

(21) Appl. No.: 17/216,072

(22) Filed: Mar. 29, 2021

(51) Int. Cl.
| | |
|---|---|
| *G06F 16/901* | (2019.01) |
| *G06F 16/22* | (2019.01) |
| *G06F 8/41* | (2018.01) |
| *G06F 16/23* | (2019.01) |
| *G06F 16/2457* | (2019.01) |
| *G06F 16/28* | (2019.01) |

(52) U.S. Cl.
CPC .......... *G06F 16/9024* (2019.01); *G06F 8/433* (2013.01); *G06F 16/2237* (2019.01); *G06F 16/2322* (2019.01); *G06F 16/24578* (2019.01); *G06F 16/287* (2019.01)

(58) Field of Classification Search
CPC ............ G06F 16/9024; G06F 16/2237; G06F 16/287; G06F 16/2322; G06F 16/24578; G06F 8/433
See application file for complete search history.

(56) References Cited

U.S. PATENT DOCUMENTS

| | | | |
|---|---|---|---|
| 2018/0152358 A1* | 5/2018 | Chheda | G06F 11/3438 |
| 2019/0339967 A1* | 11/2019 | Moondhra | G06F 16/2246 |
| 2020/0396232 A1* | 12/2020 | Lee | H04L 41/069 |

* cited by examiner

*Primary Examiner* — Ken Hoang
(74) *Attorney, Agent, or Firm* — Alston & Bird LLP

(57) ABSTRACT

Methods, apparatuses, or computer program products provide for providing interaction vectors related to a component management system. An interaction vector data structure request for a component management system may be received from a client device. The interaction vector data structure request may include one or more interaction vector identifiers and one or more component identifiers. Additionally, metadata associated with the one or more component identifiers may be retrieved. The metadata may include respective component object identifiers for the one or more component identifiers. A component dependency work graph structure may be traversed based on the respective component object identifiers to generate one or more interaction vector data structures based on one or more dependencies between component object data associated with the respective component object identifiers. Furthermore, one or more interaction vector interface elements representative of the one or more interaction vector data structures may be transmitted to the client device.

30 Claims, 16 Drawing Sheets

APPARATUSES, METHODS, AND COMPUTER PROGRAM PRODUCTS FOR GENERATING INTERACTION VECTORS WITHIN A MULTI-COMPONENT SYSTEM

BACKGROUND

Conventional systems for managing components of systems in which multiple components interact suffer from many deficiencies and problems. Through applied effort, ingenuity, and innovation, these identified deficiencies and problems have been solved by developing solutions that are configured in accordance with the embodiments of the present disclosure, many examples of which are described in detail herein.

BRIEF SUMMARY

In an embodiment, a component management system comprises one or more computers and one or more storage devices storing instructions that are operable, when executed by the one or more computers, to cause the one or more computers to receive, from a client device, an interaction vector data structure request. In an embodiment, the interaction vector data structure request comprises one or more interaction vector identifiers and one or more component identifiers. The instructions are also operable, when executed by the one or more computers, to cause the one or more computers to retrieve metadata associated with the one or more component identifiers, wherein the metadata comprises respective component object identifiers for the one or more component identifiers. The instructions are also operable, when executed by the one or more computers, to cause the one or more computers to traverse a component dependency work graph structure based on the respective component object identifiers to generate one or more interaction vector data structures based on one or more dependencies between component object data associated with the respective component object identifiers. The instructions are also operable, when executed by the one or more computers, to cause the one or more computers to transmit one or more interaction vector interface elements representative of the one or more interaction vector data structures to the client device. In an embodiment, the one or more interaction vector interface elements are configured to graphically render the one or more interaction vector data structures via an electronic interface of the client device.

In another embodiment, computer-implemented method is provided. The computer-implemented method provides for receiving, from a client device, an interaction vector data structure request for a component management system. In an embodiment, the interaction vector data structure request comprises one or more interaction vector identifiers and one or more component identifiers. The computer-implemented method also provides for retrieving metadata associated with the one or more component identifiers, wherein the metadata comprises respective component object identifiers for the one or more component identifiers. The computer-implemented method also provides for traversing a component dependency work graph structure based on the respective component object identifiers, the traversing comprising generating one or more interaction vector data structures based on one or more dependencies between component object data associated with the respective component object identifiers. The computer-implemented method also provides for transmitting one or more interaction vector interface elements representative of the one or more interaction vector data structures to the client device. In an embodiment, the interaction vector interface elements are configured to graphically render the one or more interaction vector data structures via an electronic interface of the client device.

In another embodiment, a computer program product, stored on a computer readable medium, is provided. The computer program product comprises instructions that when executed by one or more computers cause the one or more computers to receive, from a client device, an interaction vector data structure request. In an embodiment, the interaction vector data structure request comprises one or more interaction vector identifiers and one or more component identifiers. The computer program product also comprises instructions that cause the one or more computers to retrieve metadata associated with the one or more component identifiers. In an embodiment, the metadata comprises respective component object identifiers for the one or more component identifiers. The computer program product also comprises instructions that cause the one or more computers to traverse a component dependency work graph structure based on the respective component object identifiers to generate one or more interaction vector data structures based on one or more dependencies between component object data associated with the respective component object identifiers. The program code with the processor also cause the apparatus to transmit one or more interaction vector interface elements representative of the one or more interaction vector data structures to the client device. In an embodiment, the interaction vector interface elements are configured to graphically render the one or more interaction vector data structures via an electronic interface of the client device.

In yet another embodiment, system for generating a user interface is provided. The system comprises one or more computers and one or more storage devices storing instructions that are operable, when executed by the one or more computers, to cause the one or more computers to generate an interaction vector data structure request for a component management system. In an embodiment, the interaction vector data structure request comprises one or more interaction vector identifiers and one or more component identifiers. In response to the interaction vector data structure request, the instructions are also operable, when executed by the one or more computers, to cause the one or more computers to, receive one or more interaction vector interface elements representative of one or more interaction vector data structures generated based on the one or more interaction vector identifiers and the one or more component identifiers. The instructions are also operable, when executed by the one or more computers, to cause the one or more computers to render a visualization of the one or more interaction vector interface elements via an electronic interface.

In another embodiment, computer-implemented method is provided. The computer-implemented method provides for generating an interaction vector data structure request for a component management system. In an embodiment, the interaction vector data structure request comprises one or more interaction vector identifiers and one or more component identifiers. In response to the interaction vector data structure request, the computer-implemented method also provides for receiving one or more interaction vector interface elements representative of one or more interaction vector data structures generated based on the one or more interaction vector identifiers and the one or more component identifiers. The computer-implemented method also provides for rendering a visualization of the one or more interaction vector interface elements via an electronic interface.

In another embodiment, a computer program product, stored on a computer readable medium, is provided. The computer program product comprises instructions that when executed by one or more computers cause the one or more computers to generate an interaction vector data structure request for a component management system. In an embodiment, the interaction vector data structure request comprises one or more interaction vector identifiers and one or more component identifiers. In response to the interaction vector data structure request, the computer program product also comprises instructions that cause the one or more computers to receive one or more interaction vector interface elements representative of one or more interaction vector data structures generated based on the one or more interaction vector identifiers and the one or more component identifiers. The computer program product also comprises instructions that cause the one or more computers to render a visualization of the one or more interaction vector interface elements via an electronic interface.

Various other embodiments are also described in the following detailed description and in the attached claims.

BRIEF DESCRIPTION OF THE SEVERAL VIEW OF THE DRAWINGS

Having thus described some embodiments in general terms, references will now be made to the accompanying drawings, which are not drawn to scale, and wherein:

Figure 5:
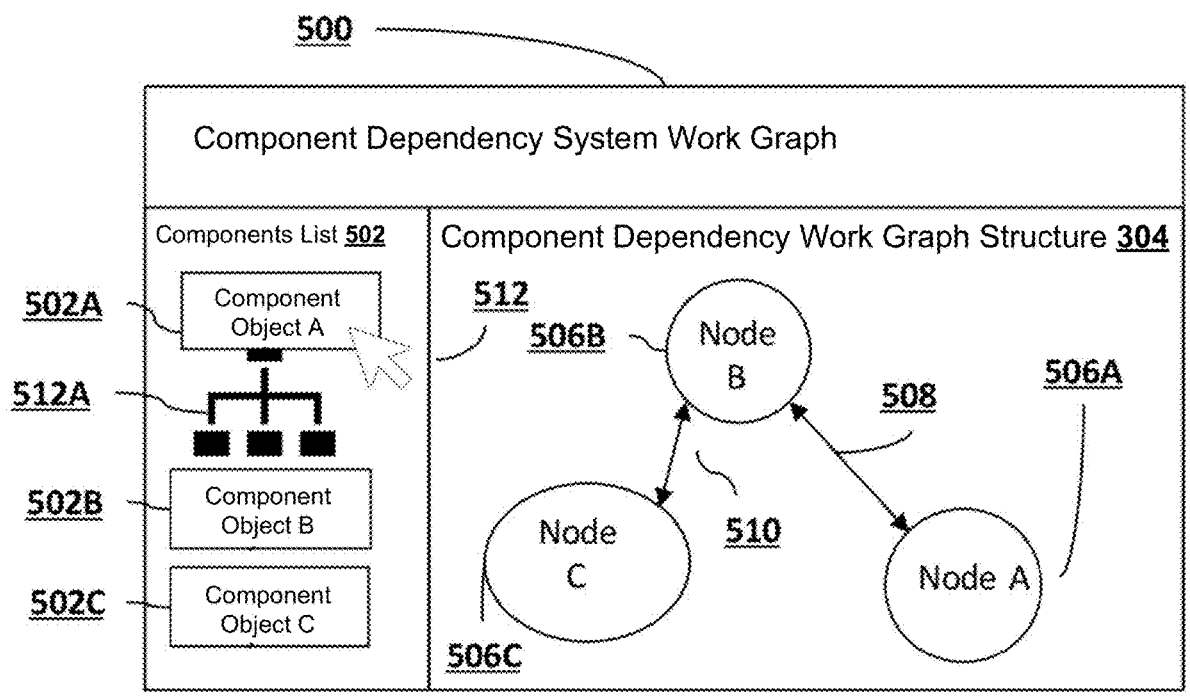

FIG. 5 provides an operational example of a component dependency work graph structure and components list in accordance with one or more embodiments of the present disclosure.

Figure 6:
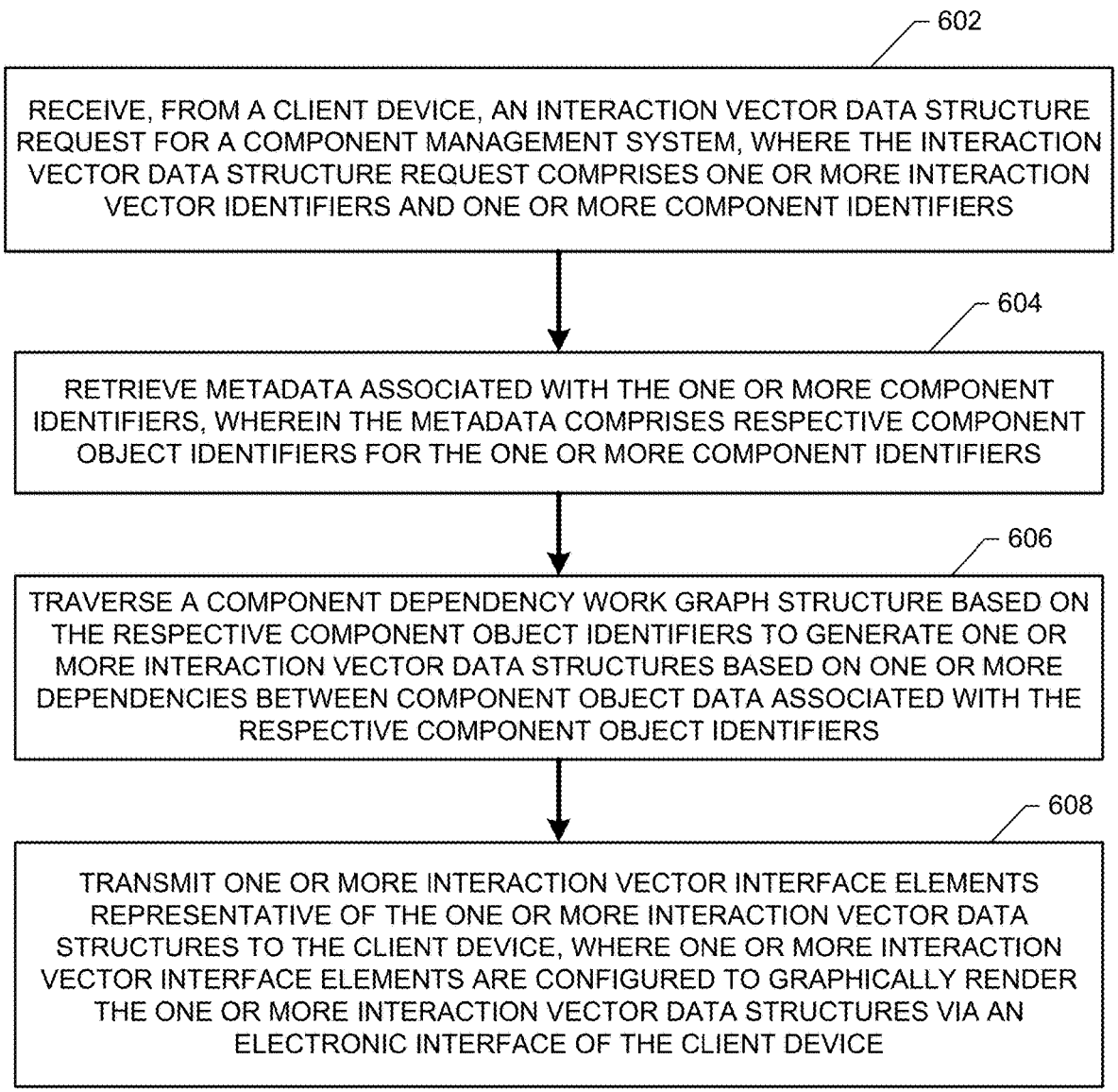

FIG. 6 is a flowchart diagram for generating interaction vector data structures associated with an example component management system in accordance with one or more embodiments of the present disclosure.

Figure 7:
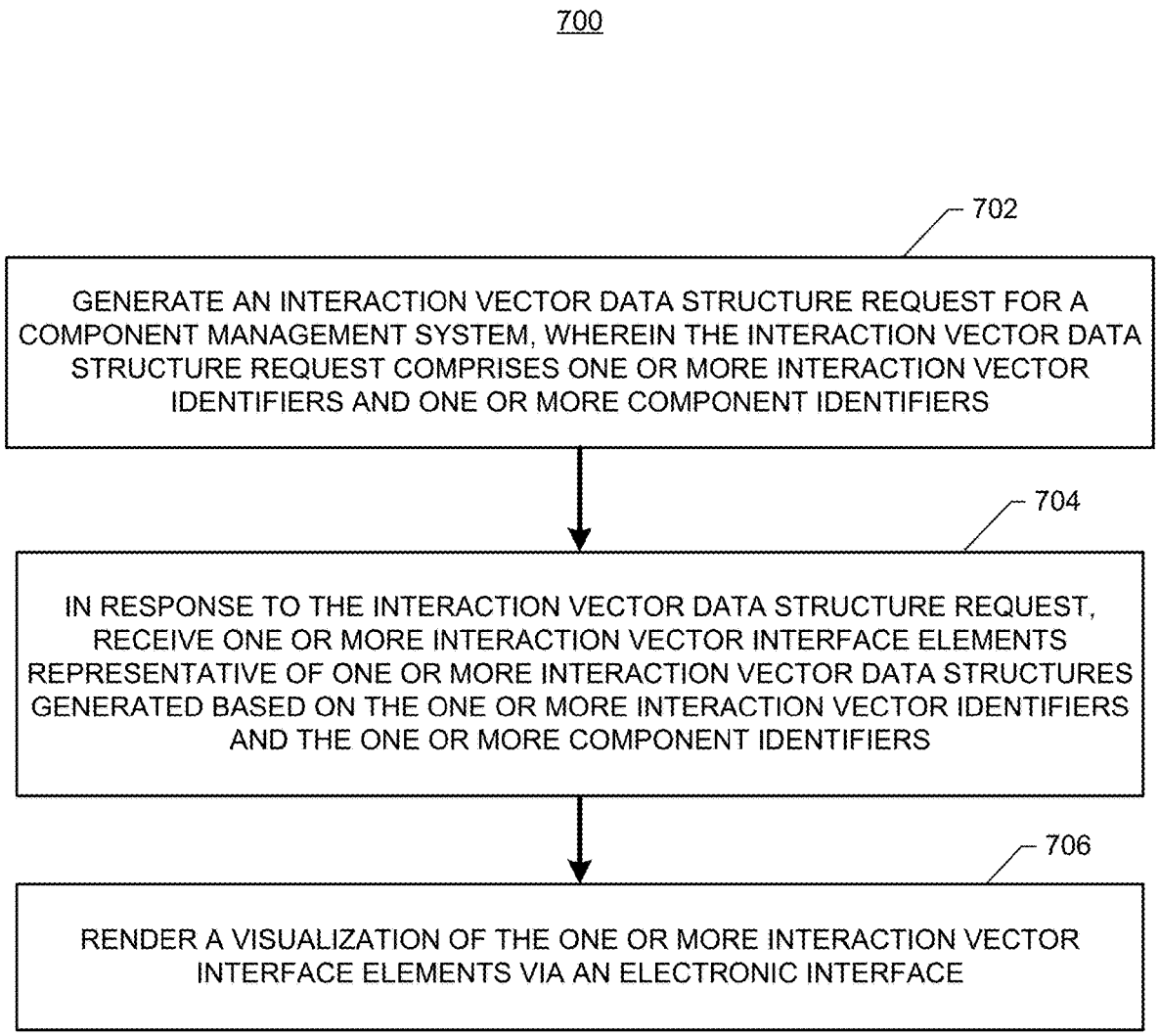

FIG. 7 is a flowchart diagram for providing one or more interaction vector interface elements via an example client device in accordance with one or more embodiments of the present disclosure.

Figure 8:
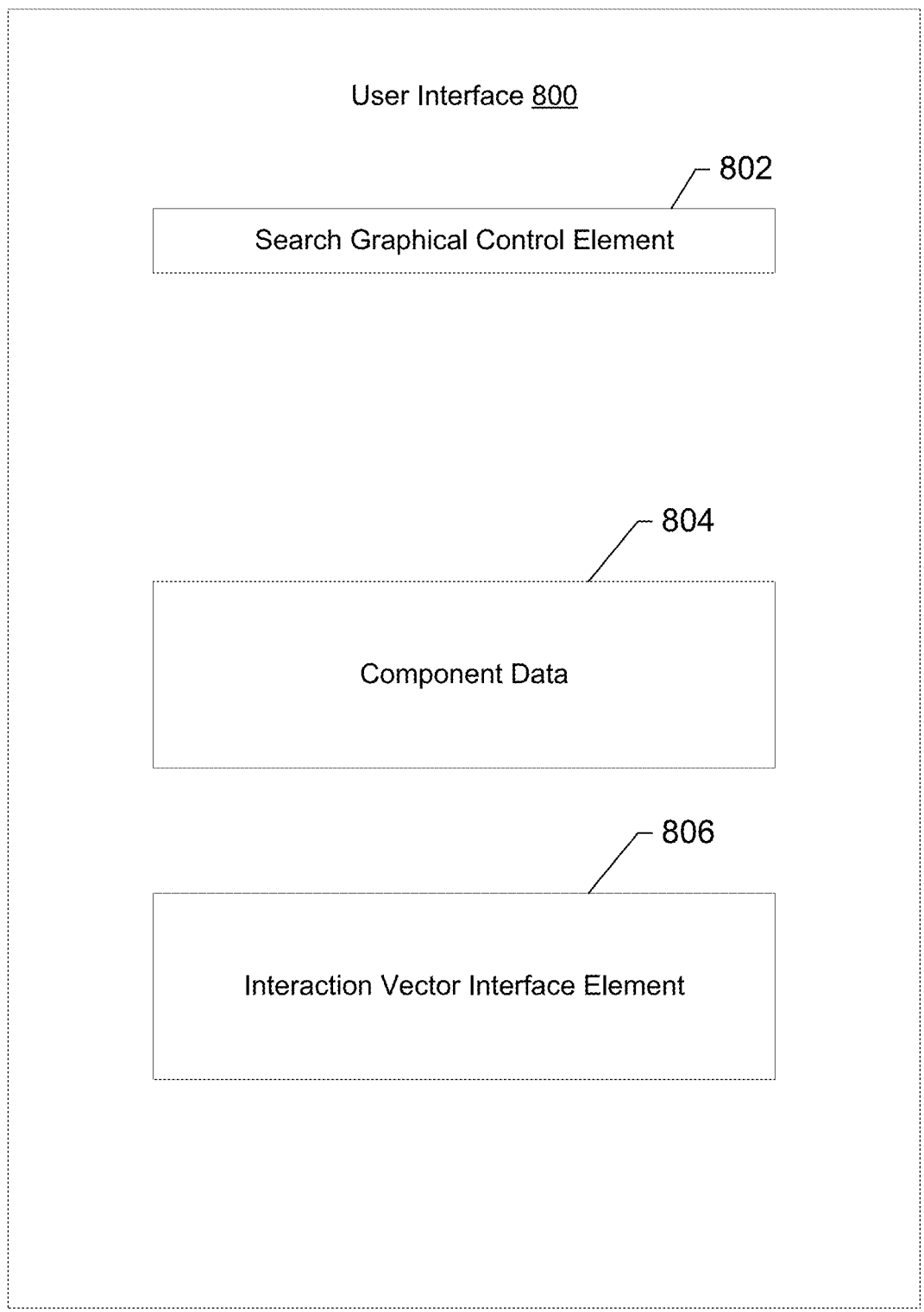

FIG. 8 illustrates an example user interface in accordance with one or more embodiments of the present disclosure.

Figure 9:
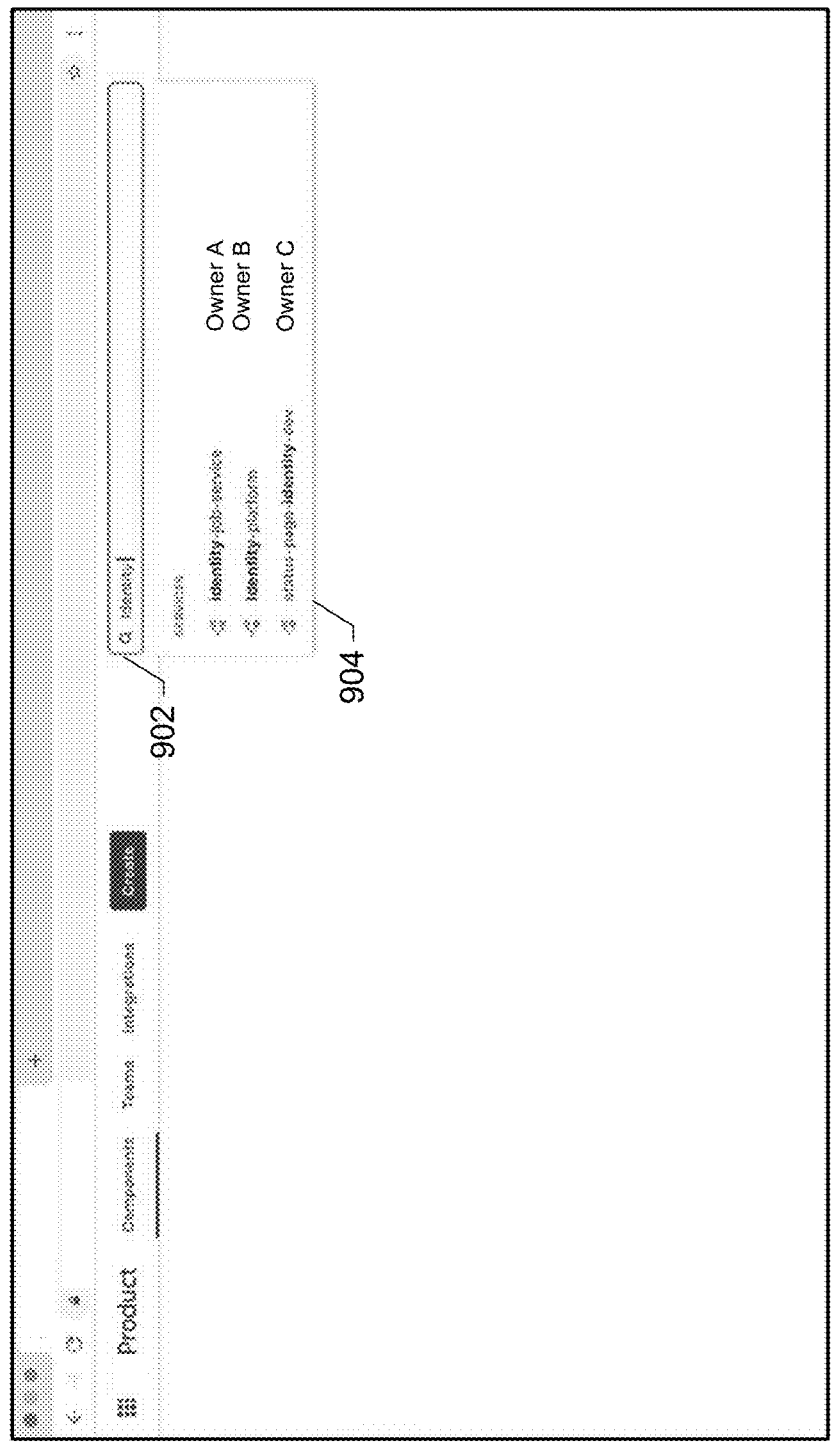

FIG. 9 illustrates an example user interface in accordance with one or more embodiments of the present disclosure.

Figure 10:
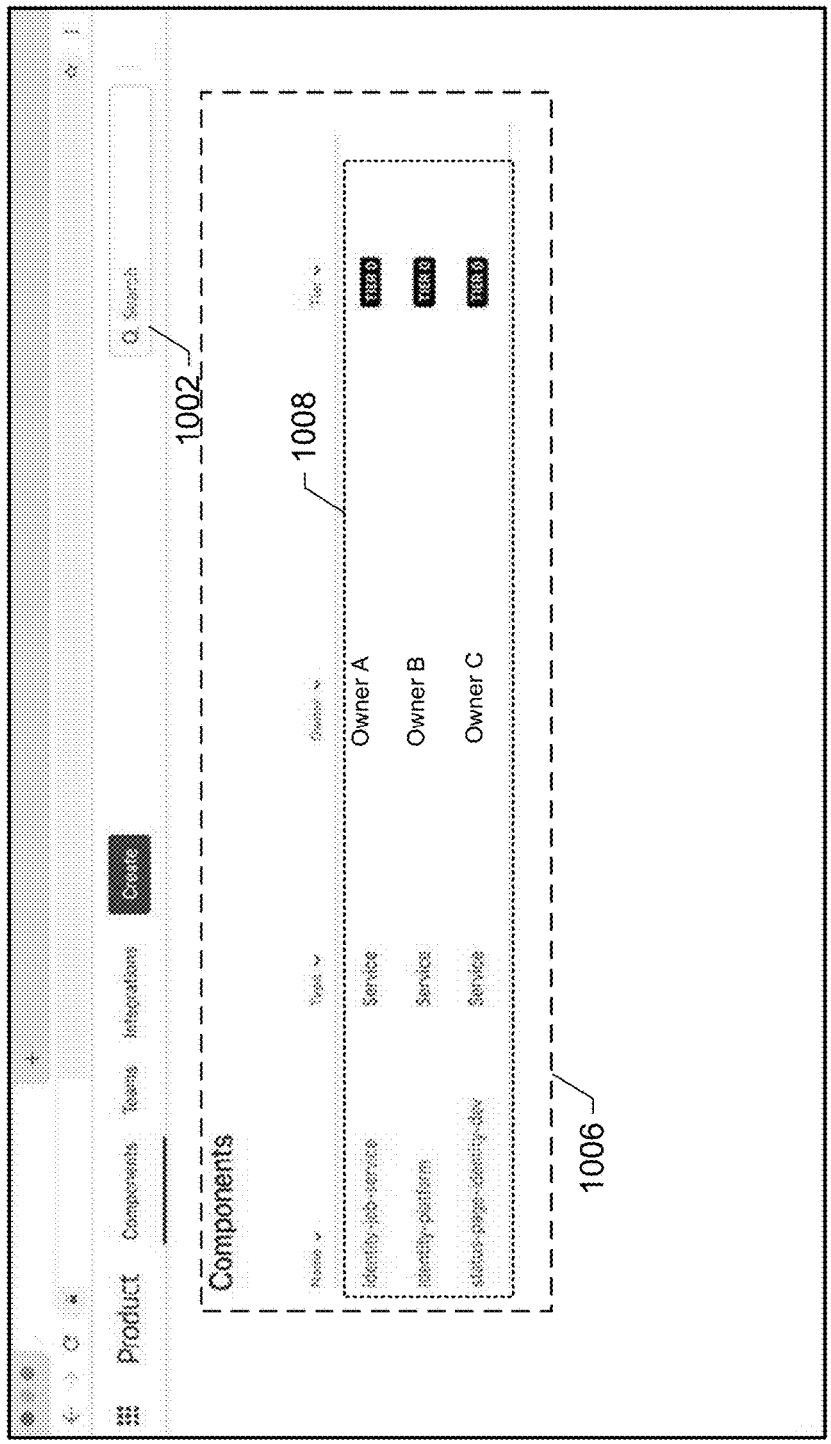

FIG. 10 illustrates an example user interface in accordance with one or more embodiments of the present disclosure.

Figure 11:
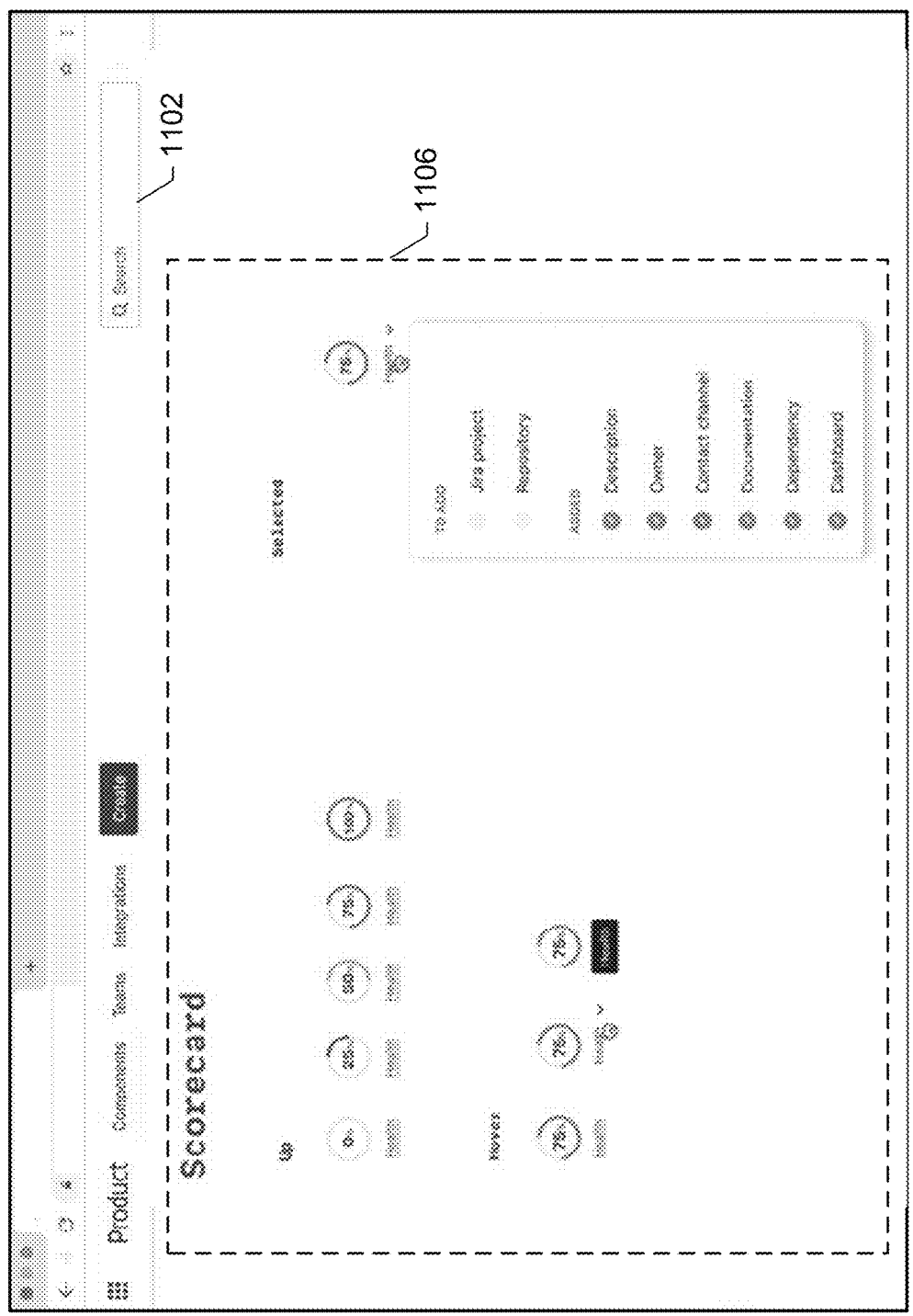

FIG. 11 illustrates an example user interface in accordance with one or more embodiments of the present disclosure.

Figure 12:
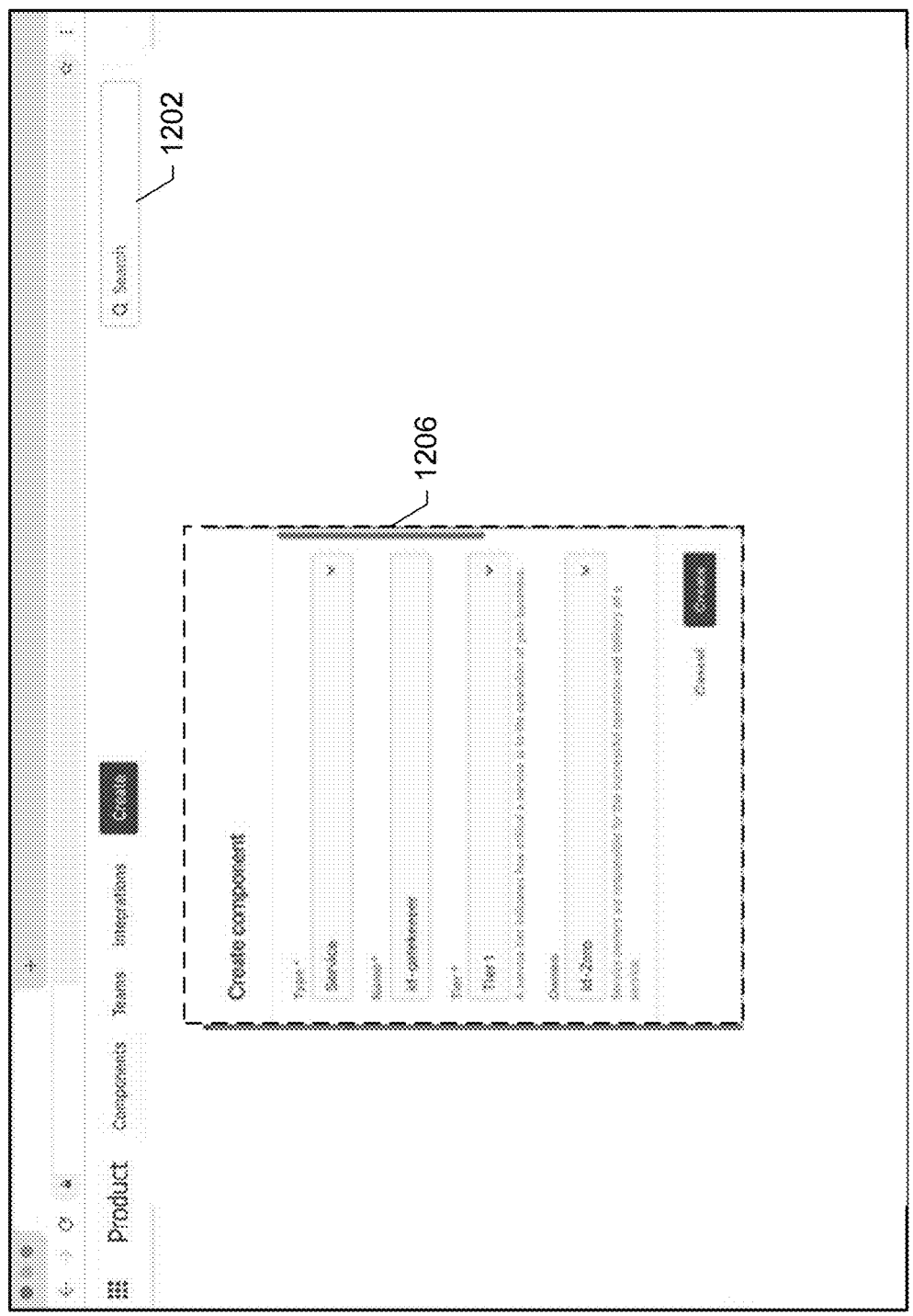

FIG. 12 illustrates an example user interface in accordance with one or more embodiments of the present disclosure.

Figure 13:
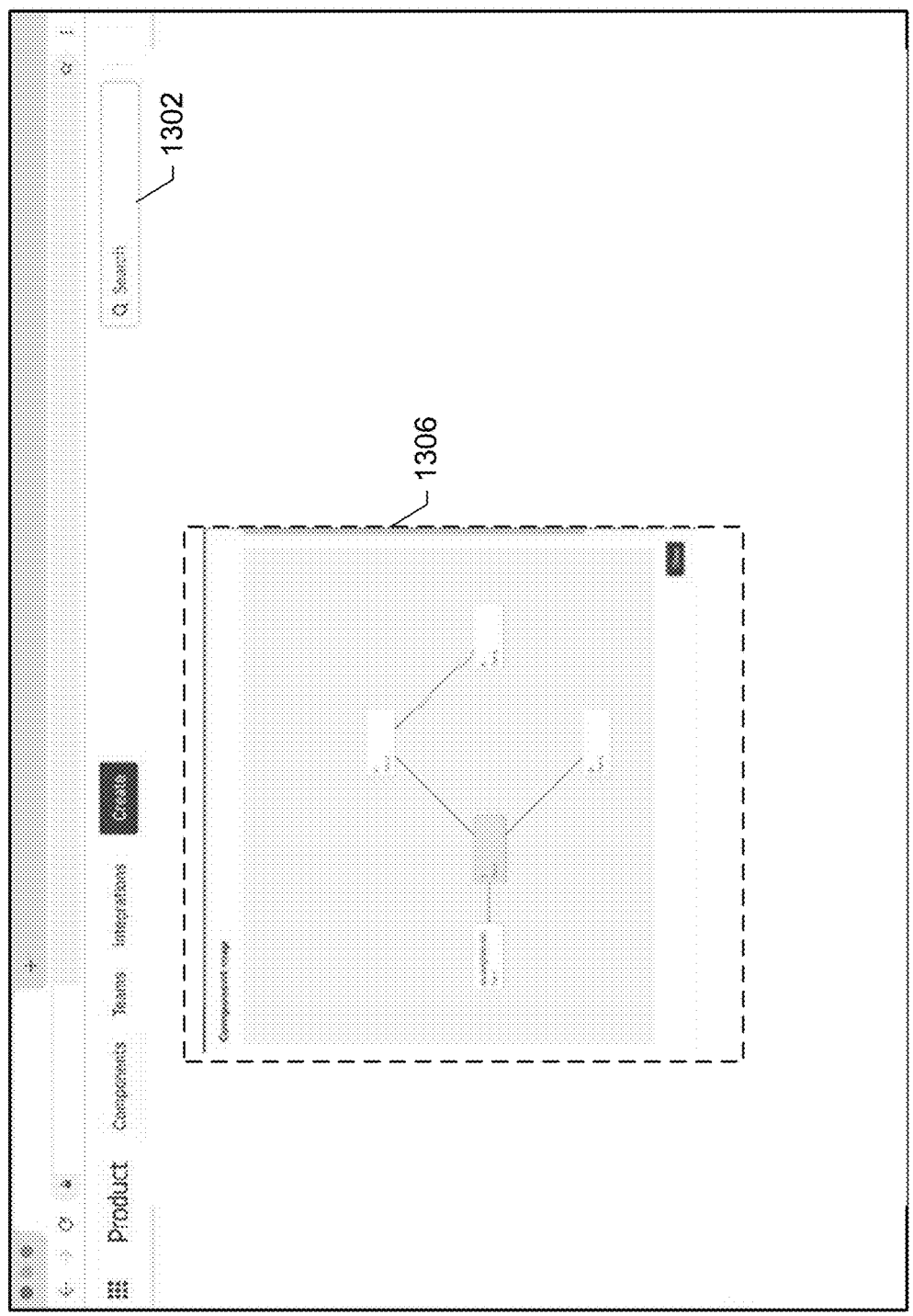

FIG. 13 illustrates an example user interface in accordance with one or more embodiments of the present disclosure.

Figure 14:
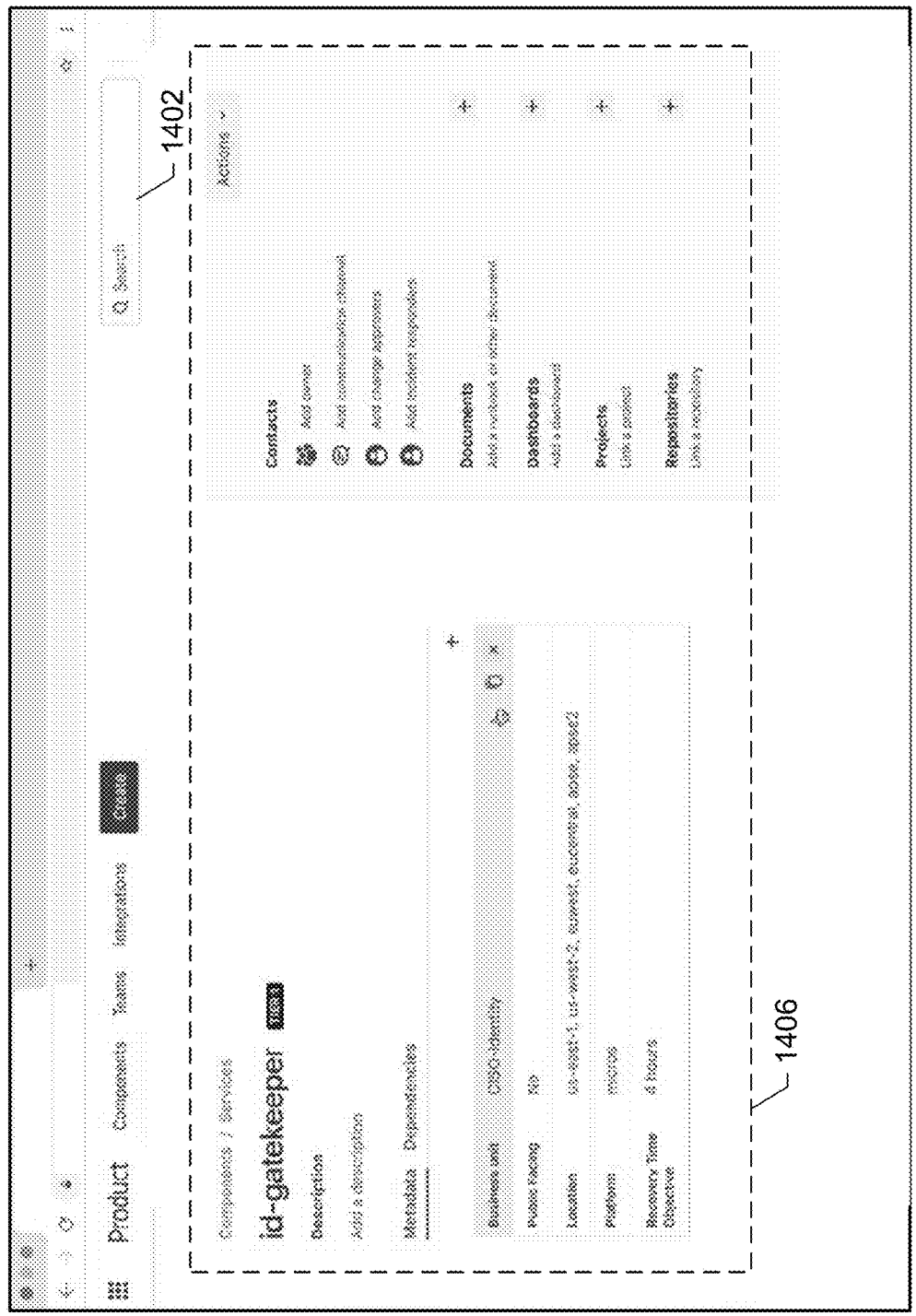

FIG. 14 illustrates an example user interface in accordance with one or more embodiments of the present disclosure.

Figure 15:
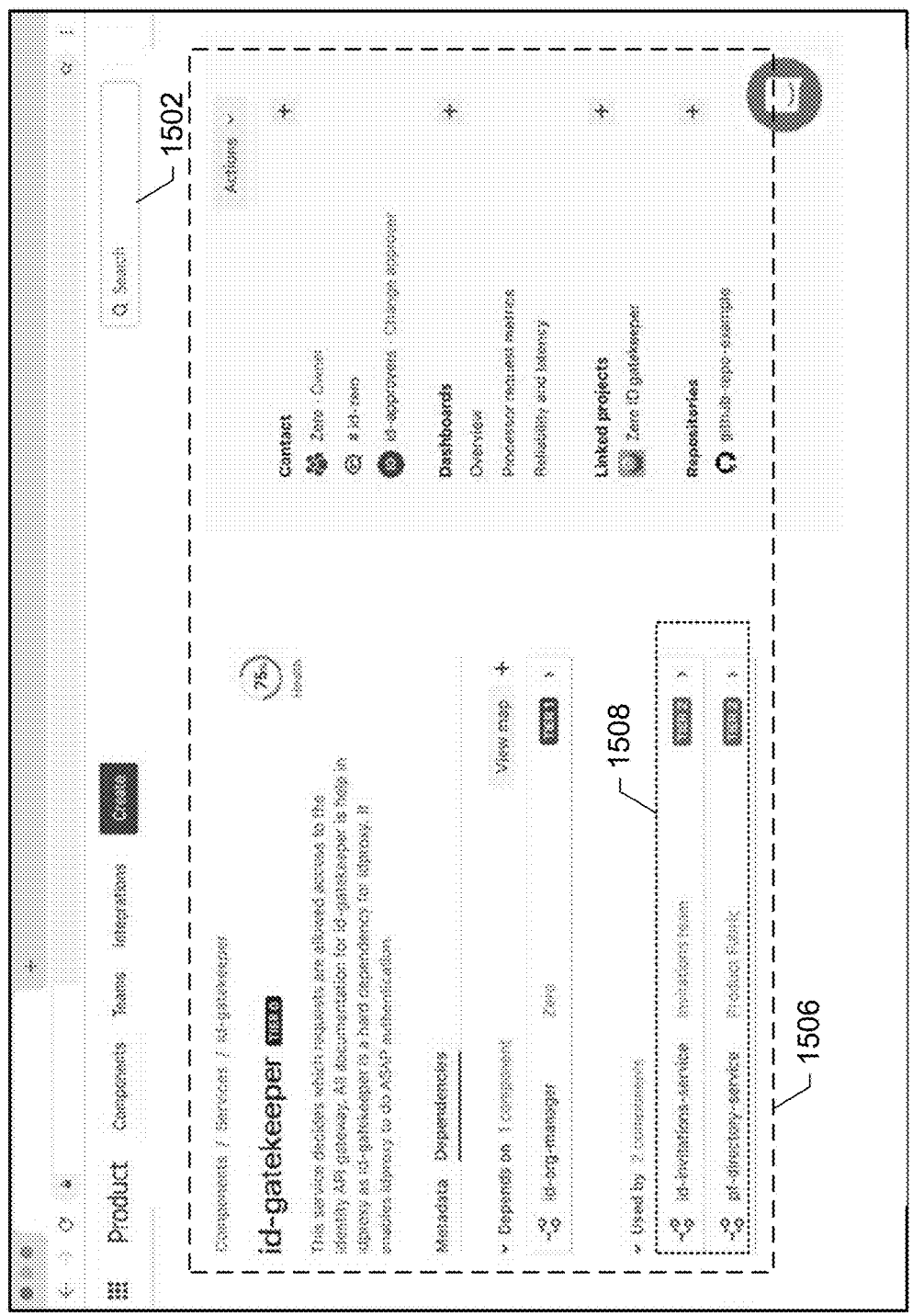

FIG. 15 illustrates an example user interface in accordance with one or more embodiments of the present disclosure.

DETAILED DESCRIPTION OF VARIOUS EMBODIMENTS

Various embodiments of the present disclosure will now be described more fully hereinafter with reference to the accompanying drawings, in which some, but not all embodiments of the present disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

Overview

Various embodiments of the present disclosure address technical problems associated with efficiently and reliably managing components of a multi-component system where multiple components/resources and/or layers of components/resources interact with one another in several complex manners. The disclosed techniques can be utilized by a component management system to provide interaction vectors that enhance effectiveness and/or efficiency of performing multi-component system management with respect to complex multi-component systems.

A complex application framework (e.g., a cloud application framework) is typically characterized by a large number of the application components (e.g., services) that are offered by the application framework. Those application components typically include a large number of frontend application components and/or a large number of backend application components. Because of the numerosity of the application components that are typically offered by a complex application framework, a large number of data objects may be generated at a time interval, subsets of which may relate to events, incidents, changes, component requests, scheduling, alerting, workflows and/or other dynamic data associated with the application framework. As such, managing data and/or computing resources related to application components of an application framework is generally difficult. Furthermore, it is generally difficult to obtain meaningful information regarding application components of an application framework. For example, consider a scenario in which it is desirable to acquire information regarding ownership of a data processor associated with an application framework, information regarding dependency of components for a particular application associated with an application framework, information regarding a set of standardized documents or procedures for a task related to one or more components associated with an application framework (e.g., information regarding a runbook for a payment gateway, etc.), or other information associated with an application framework.

Typically, management of application components of an application framework involves manual employment of spreadsheets and/or central storage with component-specific programming language files (e.g., JavaScript Object Notation (JSON) files, YAML files, etc.). However, typical techniques for managing application components of an application framework do not provide an opinionated data-model for tracking application components. Furthermore, typical techniques for managing application components of an application framework generally lack automation to facilitate the managing. It is also generally difficult to find information with typical techniques for managing application components of an application framework (e.g., due to disparate locations for data related to the application components, etc.).

As illustrated above, without being able to provide interaction vector data structures representative of data associated with relationships between data objects, a data management system will be forced to address data objects individually, which results in the need for additional performing additional processing operations and thus using unnecessary computational resources. This problem is exasperated as the number of application components in a complex multi-component system grows larger, which in turn leads to the big data processing problem of real-time processing of a large number of data objects generated as a result of an event associated with the complex multi-component system. As this description shows, a conventional management approach that relies on manual processing and/or individual processing of data objects generated by application components is not scalable, as it becomes increasingly inefficient to process data objects manually and/or on an individual level as the complexity of a multi-component system grows.

To address the above-described challenges related to managing components associated with multi-component systems, various embodiments of the present disclosure are directed to systems, apparatuses, methods and/or computer program products for providing interaction vectors related to a component management system. The component management system may be, for example, a system that manages components (e.g., application components, application micro-components, services, microservices, etc.) of an application framework (e.g., a cloud application framework). Components of the application framework may include, for example, components related to one or more layers of the application framework. In one or more embodiments, the application framework may facilitate remote collaboration between components. In one or more embodiments, the component management system provides database that tracks different components, relationships between the components, relationships between client identifiers (e.g., user identifiers) associated with the components, ownership of the components, metadata for the components, and/or other information associated with the components. In one or more embodiments, the component management system additionally or alternatively provides an incident management platform to enable collection of data objects for various multi-component systems.

In one or more embodiments, the component management system interacts with components, applications, and/or tools of the application framework to synch data into the database. In some embodiments, the component management system provides an Application Programming Interface (API) approach to interact with components, applications, and/or tools of the application framework to synch data into the database. For instance, in some embodiments, the component management system can provide an API-driven create, read, update and delete (CRUD) to enable importing and/or synching of data related to components. As such, with the component management system, components may be registered in a centralized tool with an opinionated data structure to facilitate mapping of dependencies between components, tracking ownership of components, linking to relevant tools related to the components, storing metadata for the components, and/or other management related to the components. In one or more embodiments, the component management system provides scorecards to flag incidents related to components and/or tracking of components. In one or more embodiments, the component management system provides a user interface and/or a framework-wide search of the application framework to facilitate management of the components. In one or more embodiments, the user interface provides visualization of relationship mappings between the components. It will be appreciated that an API approach is merely an example approach and is not intended to limit the scope of the present disclosure. That is, implementations outside of an API that achieve the objectives herein are within the scope of the present disclosure.

By using the described techniques, various embodiments of the present disclosure provide interaction vectors representative of relationships between data objects that can be used to increase efficiency and/or effectiveness of application management. In doing so, various embodiments of the present disclosure make substantial technical contributions to improving the efficiency and/or the effectiveness of managing application frameworks. Various embodiments of the present disclosure additionally or alternatively provide richer ownership context with respect to components of an application framework, quicker access to the relevant information with respect to components of an application framework, improved quality of metadata for components of an application framework, improved understanding of dependencies between components of an application framework, improved usability of components of an application framework, improved data quality provided by components of an application framework, improved incident investigation between components of an application framework, and/or improved remote collaboration associated with components of an application framework.

Definitions

As used herein, the terms "data," "content," "digital content," "information," and similar terms may be used interchangeably to refer to data capable of being transmitted, received, and/or stored in accordance with embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The terms "computer-readable storage medium" refers to a non-transitory, physical or tangible storage medium (e.g., volatile or non-volatile memory), which may be differentiated from a "computer-readable transmission medium," which refers to an electromagnetic signal. Such a medium can take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical, infrared waves, or the like. Signals include man-made, or naturally occurring, transient variations in amplitude, frequency, phase, polarization or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums can be substituted for or used in addition to the computer-readable storage medium in alternative embodiments.

The terms "client device," "computing device," "network device," "computer," "user equipment," and similar terms may be used interchangeably to refer to a computer comprising at least one processor and at least one memory. In some embodiments, the client device may further comprise one or more of: a display device for rendering one or more of a graphical user interface (GUI), a vibration motor for a haptic output, a speaker for an audible output, a mouse, a keyboard or touch screen, a global position system (GPS) transmitter and receiver, a radio transmitter and receiver, a microphone, a camera, a biometric scanner (e.g., a fingerprint scanner, an eye scanner, a facial scanner, etc.), or the like. Additionally, the term "client device" may refer to computer hardware and/or software that is configured to access a component made available by a server. The server is often, but not always, on another computer system, in which case the client accesses the component by way of a network. Embodiments of client devices may include, without limitation, smartphones, tablet computers, laptop computers, personal computers, desktop computers, enterprise computers, and the like. Further non-limiting examples include wearable wireless devices such as those integrated within watches or smartwatches, eyewear, helmets, hats, clothing, earpieces with wireless connectivity, jewelry and so on, universal serial bus (USB) sticks with wireless capabilities, modem data cards, machine type devices or any combinations of these or the like.

The term "server computing device" refers to a combination of computer hardware and/or software that is configured to provide a component to a client device. An example of a server computing device is the component management system 105 of FIG. 1. In some embodiments, a server computing device communicates with one or more client computing devices using one or more computer networks.

The term "circuitry" may refer to: hardware-only circuit implementations (e.g., implementations in analog circuitry and/or digital circuitry); combinations of circuits and one or more computer program products that comprise software and/or firmware instructions stored on one or more computer readable memory devices that work together to cause an apparatus to perform one or more functions described herein; or integrated circuits, for example, a processor, a plurality of processors, a portion of a single processor, a multicore processor, that requires software or firmware for operation even if the software or firmware is not physically present. This definition of "circuitry" applies to all uses of this term herein, including in any claims. Additionally, the term "circuitry" may refer to purpose built circuits fixed to one or more circuit boards, for example, a baseband integrated circuit, a cellular network device or other connectivity device (e.g., Wi-Fi card, Bluetooth circuit, etc.), a sound card, a video card, a motherboard, and/or other computing device.

The term "application framework" refers to a computing environment associated with one or more computing devices and one or more applications, where the environment enables the discovery of insights associated with components supporting at least one application. In some embodiments, the components are associated directly or indirectly with an application supported by the components. In some embodiments, the components can support the application over one or more communication networks. The application framework can include one or more applications to generate and update a repository of collected information for each component (e.g., component object repository). Accordingly, the application framework can provide for the collection of information, in the form of component objects, to generate work graphs associated with one or more components. In some embodiments, applications can compare information collected for a component with information collected for another component or a predefined threshold criteria.

The term "application," "app," or similar terms refer to a computer program or group of computer programs designed for use by and interaction with one or more networked or remote computing devices. In some embodiments, an application refers to a mobile application, a desktop application, a command line interface (CLI) tool, or another type of application. Examples of an application comprise workflow engines, component desk incident management, team collaboration suites, cloud components, word processors, spreadsheets, accounting applications, web browsers, email clients, media players, file viewers, videogames, and photo/video editors. An application can be supported by one or more components either via direct communication with the component or indirectly by relying on a component that is in turn supported by one or more other components.

The term "component" refers to a computer functionality or a set of computer functionalities, such as the retrieval of specified information or the execution of a set of operations, with a purpose that different clients can reuse for their respective purposes, together with the policies that should control its usage, for example, based on the identity of the client (e.g., an application, another component, etc.) requesting the component. Additionally, a component may support, or be supported by, at least one other component via a component dependency relationship. For example, a translation application stored on a smartphone may call a translation dictionary component at a server in order to translate a particular word or phrase between two languages. In such an example the translation application is dependent on the translation dictionary component to perform the translation task. In some embodiments, a component is offered by one computing device over a network to one or more other computing devices. Additionally, the component may be stored, offered, and utilized by a single computing device to local applications stored thereon and in such embodiments a network would not be required. In some embodiments, components may be accessed by other components via a plurality of APIs, for example, JavaScript Object Notation (JSON), Extensible Markup Language (XML), Simple Object Access Protocol (SOAP), Hypertext Markup Language (HTML), the like, or combinations thereof. In some embodiments, components may be configured to capture or utilize database information and asynchronous communications via message queues (e.g., Event Bus). Non-limiting examples of components include an open source API definition format, an internal developer tool, web based HTTP components, databased components, and asynchronous message queues which facilitate component-to-component communications. In some embodiments, a component can represent an operation with a specified outcome and can further be a self-contained computer program. In some embodiments, a component from the perspective of the client (e.g., another component, application, etc.) can be a black box (e.g., meaning that the client need not be aware of the component's inner workings). In some embodiments, a component may be associated with a type of feature, a an executable code, two or more interconnected components, and/or another type of component associated with an application framework. In some embodiments, a component may correspond to a service. Additionally or alternatively, in some embodiments, a component may correspond to a library (e.g., a library of components, a library of services, etc.). Additionally or alternatively, in some embodiments, a component may correspond to one or more modules. Additionally or alternatively, in some embodiments, a component may correspond to one or more machine learning models. For example, in some embodiments, a component may correspond to a service associated with a type of service, a service associated with a type of library, a service associated with a type of feature, a service associated with an executable code, two or more interconnected services, and/or another type of service associated with an application framework.

The term "service" refers to a type of component. In some embodiments, a service provides a visual representation of one or more data structures. In some embodiments, a service is configured for viewing data, searching for data, creating data, updating data, managing relationships among data, assigning attributes related to data, and/or storing data associated with one or more data structures. In some embodiments, a service is configured as a system, tool or product to facilitate viewing data, searching for data, creating data, updating data, managing relationships among data, assigning attributes related to data, and/or storing data associated with one or more data structures. In some embodiments, a service comprises a set of metadata attributes associated with a technical capability, a technical configuration, an application capability, an application configuration, and/or another metadata attribute. In some embodiments, a service is published to one or more client devices via one or more APIs. In some embodiments, a service is a logical representation of an application stack. In some embodiments, a service corresponds to one or more microservices.

The term "microservices" refers to a set of services that are interconnected and independently configured to provide a monolith service. In some embodiments, a microservice is configured with one or more APIs integrated with one or more other microservices and/or one or more other applications. In some embodiments, a microservice is a single-function module with a defined set of interfaces and/or a defined set of operations configured to integrate with one or more other microservices and/or one or more other applications to provide a monolith service.

The term "library" refers to a collection of objects (e.g., a collection of component objects, a collection of service objects, etc.), a collection of functions, and/or a collection of processing threads associated with one or more components.

The term "component object" refers to a data structure that represents at least one property of a component. The component object can take the structural form of a vector or other appropriate data structure for representing the component and its associated properties and/or data. For example, a component object can represent a web component provided by a server to a plurality of other computing devices over a wired and/or wireless network and, as such, the component object can contain properties associated with the web component such as an IP address, API, or the like. Component objects can be configured to follow a predefined format, such that an application can collect and store substantially similar data for each represented component in its respective component object. Data or metadata collected for each component to be represented by an associated component object can be collected directly from the component itself, a computing device associated with the component, and/or from an existing repository of component objects. In some embodiments, a component object can also represent an application or other non-component computer program that utilizes at least one component. In some embodiments, the component object may comprise a component object identifier and an attribute, the attribute comprising an array of name and value pairs with properties associated with the component. For example, a component object may be structured as: Component {Id: graph-component-1 Attributes: [{name: geolocations, value: [us, eu]}, {name: level, value: HIGH_PRIORITY},]}.

The term "component identifier" refers to one or more items of data by which a particular component may be uniquely identified.

The terms "internal component," "internal resource," or similar terms refer to a program, application, platform, or component that is configured by a developer to provide functionality to another one or more of their programs, applications, platforms, or components, either directly or indirectly through one or more other components, as opposed to using an external component. Internal components operate on a compiled code base or repository that is at least partially shared by an application which utilizes the functionality provided by the internal component. In some embodiments, the application code base and the internal component code base are hosted on the same computing device or across an intranet of computing devices. An application communicates with internal components within a shared architectural programming layer without external network or firewall separation. In some embodiments, an internal component is used only within the application layer which utilizes the internal components functionality. Information related to internal components can be collected and compiled into component objects which can also be referred to as internal component objects. An example embodiment of an internal component is a load balancer configured for routing and mapping API and/or component locations. Internal components may be configured for information-based shard routing, or in other words, routing and mapping API and/or component locations based on predefined custom component requirements associated with an application. For example, an internal component may be configured to identify where communication traffic originates from and then reply to the communications utilizing another component for reply communication.

The terms "external component," "external resource," "remote resource," or similar terms refer to a program, application, platform, or component that is configured to communicate with another program, application, platform, or component via a network architecture. In some embodiments, communications between an external component and an application calling the external component takes place through a firewall and/or other network security features. The external component operates on a compiled code base or repository that is separate and distinct from that which supports the application calling the external component. The external components of some embodiments generate data or otherwise provide usable functionality to an application calling the external component. In other embodiments, the application calling the external component passes data to the external component. In some embodiments, the external component may communicate with an application calling the external component, and vice versa, through one or more application program interfaces (APIs). For example, the application calling the external component may subscribe to an API of the external component that is configured to transmit data. In some embodiments, the external component receives tokens or other authentication credentials that are used to facilitate secure communication between the external component and an application calling the external component in view of the applications network security features or protocols (e.g., network firewall protocols). An example embodiment of an external component may include cloud components (e.g., AWS®).

The term "component object set" refers to a data structure containing one or more component objects, or component object identifiers associated therewith. A component object set may be compiled based on one or more criteria (e.g., component object data score, component object reliability score, component object criticality score, component dependency data type conflict, data residency requirement, a respective component's API compatibility, respective component's host region/country associations, the like, or combinations thereof).

The term "component object data" refers to one or more data items or elements associated with a component that are collected and represented as part of a component object. The component object data may refer to any information associated with the component represented by the component object, such as, for example, component dependency relationships, component object identifiers, performance metrics for the respective component (e.g., processor usage, access logs, crash reports, etc.), encryption keys, hardware requirements, associated computing devices, IP addresses, API compatibility, a host computing device's physical location (e.g., GPS coordinates, country name, etc.), the like, or combinations thereof. In some embodiments, the component object data may be one or more encrypted or unencrypted files, for example, JSON files, XML files, SOAP files, HTML files, the like, or combinations thereof. In some embodiments, component object data may comprise one or more of a component object identifier and an attribute associated with a component. In embodiments, the attribute may comprise an array of name and value pairs representative of properties of the component such as a component host name and/or geolocation. For example, component object data may be structured with attributes associated with a host component as: Host {Id: graph-host-1 Attributes: [{name: geolocations, value: [us, eu]}, {name: name, value: hostx.foo.internal.company.net},]}. In some embodiments, component object data may be fetched from a host system or server for one or more components.

The term "multi-component system" refers to a system (e.g., a server system, a cloud-based system, etc.) where multiple components, multiple resources associated with components, multiple layers of components, and/or multiple layers of resources interact with one another in several complex manners.

The term "component object identifier" refers to one or more data items or elements by which a component object may be uniquely identified. The component object identifier may include, for example, one or more of Internet Protocol (IP) addresses associated with a component, Uniform Resource Locators (URLs) associated with a component, numerical characters, alphabetical characters, alphanumeric codes, American Standard Code for Information Interchange (ASCII) characters, encryption keys, identification certificates, the like, or combinations thereof. An example embodiment of a component object identifier may comprise data provided by at least a component author, for example, a URL and a payload associated with a component. In some embodiments, the payload comprises a JSON formatted text that is either posted, by way of an HTTP POST, to a component when a resource is created or returned from a component, through an HTTP GET, when at least a resource is requested from the component.

The term "component dependency object" refers to a data structure representing a relationship between a component, or application, that relies on the functionality or a set of functionalities provided by another component. For example, an application may receive encrypted data from a first component, or application, and in order for the application to read the encrypted data it needs to be authenticated by a second component, which upon authentication provides an encryption key to read the encrypted data. In such an example, the component dependency object can be configured to represent a relationship between the first component, or application, and the second component. For example, the component dependency object may identify that an authentication process relationship requires the exchange of encrypted data. In some embodiments, component dependency objects can be configured to identify the first component, or application, and the second component such as by storing component object identifiers associated with each.

The term "component dependency object identifier" refers to one or more data items or elements by which a component dependency object may be uniquely identified. The component dependency object identifier may include, for example, one or more of Internet Protocol (IP) addresses associated with a first and/or second component, Uniform Resource Locators (URLs) associated with a first and/or second component, numerical characters, alphabetical characters, alphanumeric codes, American Standard Code for Information Interchange (ASCII) characters, encryption keys, identification certificates, the like, or combinations thereof.

The term "component object repository" refers to a database stored on a memory device which is accessible by one or more computing devices for retrieval and storage of one or more of component objects, component dependency objects, the like, or combinations thereof. The component object repository may be configured to organize component objects stored therein in accordance with a particular component object category. In some embodiments, the component object repository may be stored on a server remotely accessible by a computing device or on a memory device on-board the computing device.

The term "component object category" refers to a category (e.g., a classification) for one or more component objects. For example, a component object category may provide context for respective one or more component objects. For example, a component object category may provide context with respect to a particular type of component object, a particular application, a particular type of component dependency object, a particular network function, a particular API, a particular Web component, a particular geographical location, the like, or combinations thereof.

The term "component dependency work graph structure" refers to a data structure configured to represent dependency relationships between an application and its associated components. For example, a component dependency work graph structure may comprise component objects and component object dependencies that represent networks of communication, data organization, computing devices, data exchanged, data events, the like, or combinations thereof for a plurality of components relied on by an application. In some embodiments, component objects are represented by nodes of the component dependency work graph structure. In some embodiments, component dependency objects are represented by edges of the component dependency work graph structure. In some embodiments, a graphical representation of the component dependency work graph structure can be, at least partially, rendered via a graphical user interface. The component dependency work graph structure can comprise one or more weighted graphs, multigraphs, isomorphic graphs, trees, the like, or combinations thereof.

The terms "dependency data structure," "dependency data path," or the like refers to a combination of one or more component objects and/or one or more component dependency objects within a component dependency work graph structure that connects a first component object to a second component object.

The term "component management interface type" refers to a particular API, type of API, or the like, that facilitates the exchange of data between components.

The term "component dependency data type" refers to a type of data object or functional operation type exchanged between components. For example, a first component may be dependent on a second component to provide data lookup. In such an example, the component dependency data type would be a lookup type. The component dependency data type may comprise one or more of a Domain Name System (DNS) lookup, tracing, access logs, messaging, manual, component, domain names, data classification, the like, or combinations thereof. In some embodiments of the present disclosure a developer can define component dependency data types and criteria associated therewith such that one or more applications can identify the developer defined component dependency data types for components from component object data.

The term "component dependency data residency type" refers to a particular component dependency data type which identifies a residency requirement associated with data exchanged between components. The component dependency data residency type is indicative of a relative geolocation (e.g., geolocation identifying data object) associated with one or more components, and data received or transfer thereby, with respect to a dependent application. In some embodiments, component dependency data residency type may be assigned to a first component based on the component relationship to a second component. For example, if the first component is hosted in country A and is dependent on a function from the second component hosted in country B the component dependency data residency type for the second component may be set to represent a foreign location. If country B was also determined to be a safe country for data transfer by country A then the component dependency data residency type for the second component may be set to represent a foreign but safe or allowed location. The component dependency data residency types may include, for example, local, foreign, secure, unsecured, allowed, restricted, preferred, a particular country (e.g., Spain, etc.), the like, or combinations thereof. In some embodiments, the component dependency data residency types may be represented by numerical code, alphabetical code, the like, or combinations thereof.

The term "component dependency work graph node," "node," or the like may be used interchangeably to refer to a node or vertex of a component dependency work graph structure. The component dependency work graph node is representative of a component object associated with the component dependency work graph structure. Accordingly, the component dependency work graph node may represent a component in relation to component dependency relationships further represented by edges, links, or lines within the component dependency work graph structure.

The term "component dependency work graph edge," "edge," or the like may be used interchangeably to refer to a representation of a relationship between a first component, represented by a first component dependency work graph node, and a second component, represented by a second component dependency work graph node, depicted within a component dependency work graph structure. In some embodiments, the component dependency work graph edge may be represented by one or more lines, links, arrows, the like, or combinations thereof.

The terms "component relationship," "component dependency relationship," or similar terms refer to an exchange of data and/or functionality between a first component, or application, and a second component. For example, the first component may be directly dependent upon the second component for a DNS lookup. In some embodiments, the second component may be directly dependent upon a third component whereby the first component is transitively dependent upon the third component via the second component. As such, the component dependency relationship may be a direct relationship comprising two components or it may be a transitive relationship comprising a plurality of components. In some embodiments, a first component and a second component may have a plurality of dependency relationships between them. For example, the second component may perform both a lookup and access log function for the first component.

The term "nested component dependency" refers to a plurality of components that are interdependent on each other such that a first component is transitively dependent on at least one other component via a second component. For example, a graph (e.g., tree) representing a nested component dependency may be structured in such a way as to represent that a first component, represented by a first component object, is dependent on a plurality of second components, each represented by their own respective component object, which are in turn each dependent upon a plurality of third components, each represented by their own respective component object. In some embodiments, the nested component dependency may be represented by a nested component dependency object that comprises data for one or more transitive component object relationships. For example, a nested component dependency may capture dependent relationships that traverse more than two directly communicable components. The information captured for an associated nested component dependency may comprise all component dependencies stemming from a component. A query to a component dependency work graph data structure, according to embodiments herein, can be made for one or more of a dependency relationship directly associated with a component, a dependency relationship removed from a component according to a fixed number of transitive relationships, or all dependency relationships stemming from a component without a transitive number restriction. In some embodiments, a component dependency work graph data structure may support intelligent groupings of dependency relationships. For example, a linear chain of five dependent components may be grouped into a single nested component dependency for convenient representation.

The term "nested component dependency structure" refers to a data structure that comprises a plurality of component objects associated with a particular nested component dependency.

The term "nested component dependency object identifier" refers to one or more data items or elements by which a plurality of component objects associated with a particular nested component dependency relationship may be identified. In some embodiments, the nested component dependency object identifier comprises, at least partially, the component object identifier for each associated component object.

The term "interaction vector data structure request" refers to a signal received by one or more computing devices (e.g., servers, systems, platforms, etc.) which are configured to cause a component management system associated with the one or more computing devices to generate and/or return one or more interaction vector data structures associated with one or more components. The interaction vector data structure request may be received via a component management interface, an API, a communication interface, the like, or combinations thereof. In one or more embodiments, the interaction vector data structure request may be generated by a client device via one or more computer program instructions.

The term "insight" refers to contextual information related to one or more component objects. In some embodiments, an insight may provide information regarding one or more relationships, one or more mappings, and/or one or more dependencies between component objects. In some embodiments, an insight may provide a categorization and/or a classification for a group of component objects.

The term "interaction vector data structure" refers to a combination of component objects (e.g., one or more component objects within a component dependency work graph structure) related to a particular insight. For example, in some embodiments, an interaction vector data structure may include a set of component objects that provide data for a particular insight.

The term "interaction vector interface element" refers to a formatted version of one or more interaction vector data structures to facilitate a visualization and/or human interpretation of data associated with the one or more interaction vector data structures via an electronic interface. In one or more embodiments, an interaction vector interface element may additionally or alternatively be formatted for transmission via one or more networks. In one or more embodiments, an interaction vector interface element may include one or more graphical elements and/or one or more textual elements.

The term "ranked interaction vector list interface element" refers to a formatted version of interaction vector data structures that provides (e.g., renders via an electronic interface) a ranking of the interaction vector data structures. Ranking may refer to an arrangement of interaction vector data structures in relation to one another. A ranked interaction vector list interface element may provide optimized visualization and/or human interpretation of data associated with interaction vector data structures via an electronic interface. In one or more embodiments, a ranked interaction vector list interface element may provide a ranking of interaction vector data structures based on insights for respective interaction vector data structures of the interaction vector interface elements. In one or more embodiments, a ranked interaction vector list interface element may additionally or alternatively be formatted for transmission via one or more networks. In one or more embodiments, a ranked interaction vector list interface element may include two or more graphical elements and/or two or more textual elements that are ranked based on insights for the two or more graphical elements and/or the two or more textual elements.

The term "grouped interaction vector list interface element" refers to a formatted version of interaction vector data structures that provides (e.g., renders via an electronic interface) a grouping or specific arrangement of the interaction vector data structures. Grouping may refer to arranging interface elements in close or other proximity to one another suggesting a relationship or providing a visualization of the interface elements in relation to one another. A grouped interaction vector list interface element provides optimized visualization and/or human interpretation of data associated with interaction vector data structures via an electronic interface. In one or more embodiments, a grouped interaction vector list interface element may provide a grouping of interaction vector data structures based on a comparison between insights for respective interaction vector data structures of the interaction vector interface elements. In one or more embodiments, a grouped interaction vector list interface element may additionally or alternatively be formatted for transmission via one or more networks. In one or more embodiments, a grouped interaction vector list interface element may include two or more graphical elements and/or two or more textual elements that are grouped based on a comparison between insights for the two or more graphical elements and/or the two or more textual elements.

The term "interaction vector identifier" refers to an identifier (e.g., a bit, a logic state, a sequence of data) that indicates a request to initiate an insight process related to one or more processes.

The term "visualization" refers to visual representation of data (e.g., one or more interaction vector interface elements) to facilitate human interpretation of the data. In some embodiments, visualization of data includes graphic representation and/or textual representation of data.

The term "search graphical control element" refers to a computer input element that allows a user to enter a query (e.g., a string of text) to facilitate a search associated with a component management system (e.g., a component object repository of a component management system).

The term "interface area" refers to an area of an electronic interface, where the area may be situated in relation to one or more other interface areas of the electronic interface. An interface area may be comprised of groupings of pixels, or may be defined according to coordinates of a display device configured to render the interface. A size of an interface may be adjusted according to parameters associated with the display device. An interface area may include one or more interface elements. For example, an interface element may include a visualization. In certain embodiments, an interface area may include one or more graphical elements and/or or more textual elements. In certain embodiments, an interface area may be void of an interface element and/or a visualization. In certain embodiments, an interface area may include a search graphical control element and/or one or more other interactive interface elements.

The term "ownership" refers to identification of one or more client identifiers that are assigned as an owner, manager, and/or a creator of a component.

The term "structured metadata" refers to data regarding an ordering, grouping and/or a clustering of metadata. In some embodiments, structured metadata is associated with a type of metadata, a version of metadata, a relationship between metadata, and/or a classification for metadata.

The term "incident investigation information" refers to information related to management of one or more incidents associated with one or more components. In one or more embodiments, incident investigation information includes one or more alerts, one or more messages, and/or one or more workflows associated with one or more identified incidents related to one or more components.

The term "change management information" refers to information related to management of one or more changes associated with one or more components. In one or more embodiments, incident investigation information includes one or more alerts, one or more messages, and/or one or more workflows associated with one or more changes related to one or more components.

The term "analytics information" refers to information related to computational analysis and/or statistics for data. In one or more embodiments, analytics information includes one or more charts and/or one or more graphs related to facilitate interpretation and/or communication of computational analysis and/or statistics for data.

The term "component scorecard" refers to graphics information that quantifies data associated with one or more components. In one or more embodiments, a component scorecard includes one or more key performance indicators, one or more quality indicators, one or more quantity indicators, and/or one or more other metrics that quantifies data associated with one or more components.

The term "time dimension" refers to tagging one or more data objects with a time stamp in order to reference when a data object was created and/or updated. For example, a first component object may be added to a component dependency work graph data structure and tagged with a time stamp for '01:00:00 AM' and then the first component may be replaced by a second component at '01:05:00 AM.' In such an embodiment, a component dependency work graph data structure may be tracked for changes over time and as such a component dependency graph data structure can represent certain component dependencies for a given time based on historical data recorded in relation to a time stamp.

The term "event" refers to one or more changes and/or one or more incidents related to one or more components. In some embodiments, an event may be associated with a unique identifier, one or more attributes, one or more tags, one or more classifications, one or more source identifiers, one or more object types, and/or other context data. Additionally, in some embodiments, an event may be triggered via one or more components. In some embodiments, an event may be associated with an event stream. In some embodiments, an event can be related to one or more changes and/or one or more incidents with respect to a component object repository. In some embodiments, an event can be related to a client device that interacts with a component. For example, in some embodiments, an event can be related to one or more changes and/or one or more incidents initiated via a display screen of a client device.

The term "event stream" refers to a collection of events related to one or more components. For example, an event stream can include a first event associated with at least one component, a second event associated with the at least one component, a third event associated with the at least one component, etc.

Thus, use of any such terms, as defined herein, should not be taken to limit the spirit and scope of embodiments of the present disclosure.

Example System Architecture

Methods, apparatuses, and computer program products of the present disclosure may be embodied by any of a variety of devices. For example, the method, apparatus, and computer program product of an example embodiment may be embodied by a networked device (e.g., an enterprise platform, etc.), such as a server or other network entity, configured to communicate with one or more devices, such as one or more query-initiating computing devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, the like or any combination of the aforementioned devices.

Figure 1:
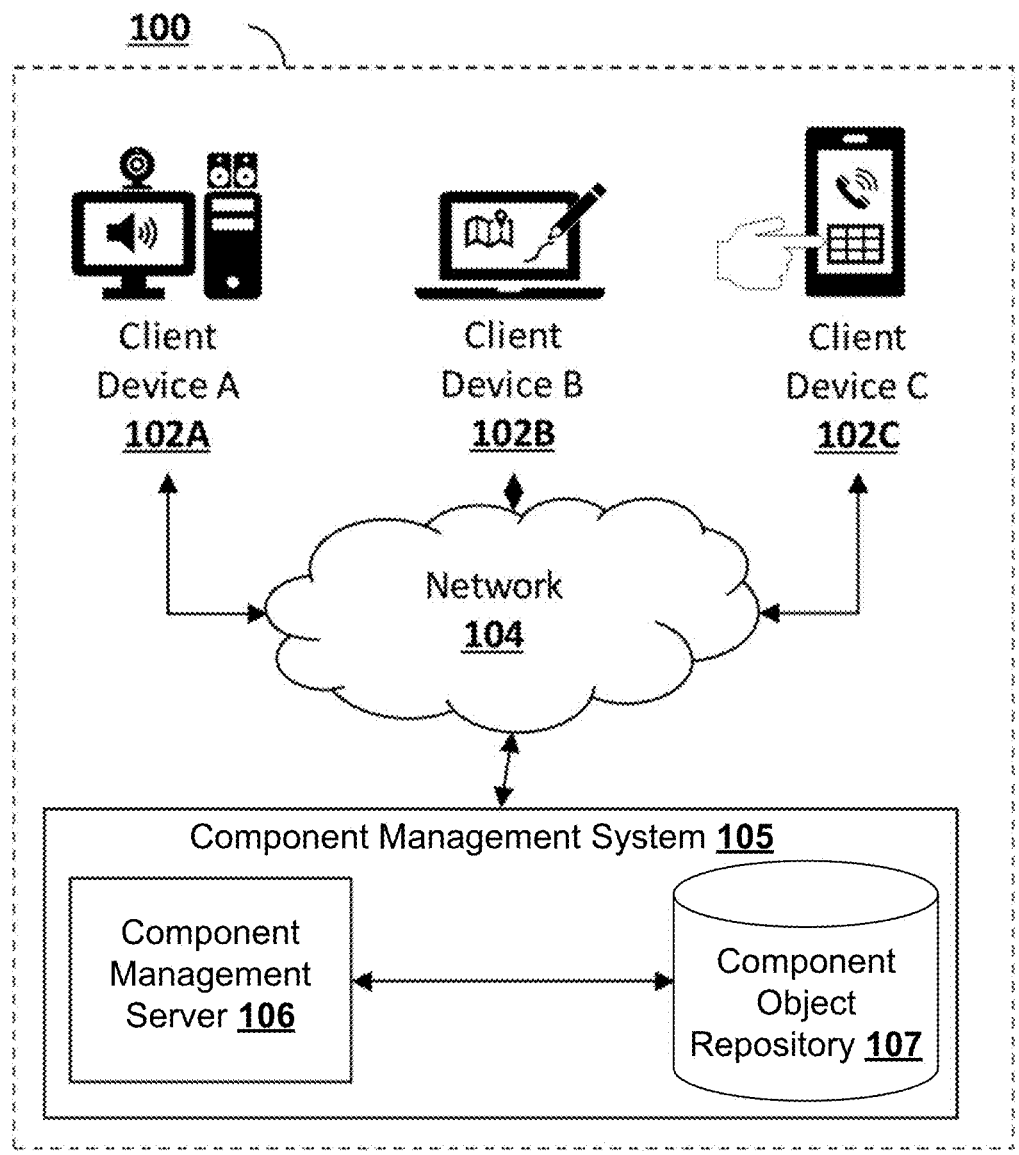
FIG. 1 is a block diagram of an example component management system within which one or more embodiments of the present disclosure may operate.

FIG. 1 illustrates an example system architecture 100 within which embodiments of the present disclosure may operate. The system architecture 100 includes a component management system 105 configured to interact with one or more client devices 102A-C, such as client device 102A, client device 102B, and client device 102C. In one or more embodiments, the one or more client devices 102A-C may be configured to interact with one or more components managed by the component management system 105. For example, in one or more embodiments, the one or more client devices 102A-C may be configured to send data to the one or more components managed by the component management system 105 and/or receive data from the one or more components managed by the component management system 105. In an embodiment, the component management system 105 can be associated with an application framework. In one or more embodiments, the component management system 105 may be configured to receive one or more interaction vector data structure requests from the client devices 102A-C, process the one or more interaction vector data structure to determine one or more insights associated with one or more components, generate one or more user interfaces (e.g., one or more electronic interfaces, and/or provide data for rendering the user interfaces to the client devices 102A-C. In one or more embodiments, the one or more interaction vector data structure requests may include one or more interaction vector identifiers and/or one or more component identifiers. For example, in one or more embodiments, the one or more component identifiers may identify the one or more components. Furthermore, in one or more embodiments, the one or more interaction vector identifiers may indicate one or more types of insights for one or more components associated with the one or more component identifiers. Additionally or alternatively, in one or more embodiments, the one or more interaction vector identifiers may indicate a request to initiate one or more insight processes to obtain data for one or more interaction data structures and/or one or more insights for one or more components associated with the one or more component identifiers, and/or other information.

The component management system 105 may communicate with the client devices 102A-C using a network 104. The network 104 may include any wired or wireless communication network including, for example, a wired or wireless local area network (LAN), personal area network (PAN), metropolitan area network (MAN), wide area network (WAN), the like, or combinations thereof, as well as any hardware, software and/or firmware required to implement the network 104 (e.g., network routers, etc.). For example, the network 104 may include a cellular telephone, an 802.11, 802.16, 802.20, and/or WiMAX network. Further, the network 104 may include a public network, such as the Internet, a private network, such as an intranet, or combinations thereof, and may utilize a variety of networking protocols now available or later developed including, but not limited to Transmission Control Protocol/Internet Protocol (TCP/IP) based networking protocols. In some embodiments, the protocol is a custom protocol of JSON objects sent via a WebSocket channel. In some embodiments, the protocol is JSON over RPC, JSON over REST/HTTP, the like, or combinations thereof.

A client device from the one or more client devices 102A-C may include a mobile device, a smart phone, a tablet computer, a laptop computer, a wearable device, a personal computer, an enterprise computer, a virtual reality device, or another type of computing device. In one or more embodiments, a client device from the one or more client devices 102A-C includes geolocation circuitry configured to report a current geolocation of the client device. In some embodiments, the geolocation circuitry of the client device may be configured to communicate with a satellite-based radio-navigation system such as the global position satellite (GPS), similar global navigation satellite systems (GNSS), or combinations thereof, via one or more transmitters, receivers, the like, or combinations thereof. In some embodiments, the geolocation circuitry of the client device may be configured to infer an indoor geolocation and/or a sub-structure geolocation of the client device using signal acquisition and tracking and navigation data decoding, where the signal acquisition and tracking and the navigation data decoding is performed using GPS signals and/or GPS-like signals (e.g., cellular signals, etc.). Other examples of geolocation determination include Wi-Fi triangulation and ultra-wideband radio technology.

The component management system 105 may include a component management server 106 and a component object repository 107. The component management server 106 may be configured to retrieve metadata associated with the one or more component identifiers included in the one or more interaction vector data structure requests. In one or more embodiments, the component management server 106 may be configured to retrieve component object data. For example, in one or more embodiments, the component management server 106 may be configured to retrieve respective component object identifiers for the one or more component identifiers. The component object repository 107 may store data associated with one or more component objects associated with the component management system 105. Additionally or alternatively, the component object repository 107 may store data associated with one or more event streams for the one or more component objects. For example, the component object repository 107 may store data associated with one or more component object data, component dependency objects, component dependency object identifiers, event streams, component dependency work graph structures, component dependency data type, the like, any division, and/or combinations thereof. The component object repository 107 may include one or more storage units, such as multiple distributed storage units that are connected through a computer network. Each storage unit in the component object repository 107 may store at least one of one or more data assets and/or one or more data about the computed properties of one or more data assets. Moreover, each storage unit in the component object repository 107 may include one or more non-volatile storage or memory media including but not limited to hard disks, ROM, PROM, EPROM, EEPROM, flash memory, MMCs, SD memory cards, memory sticks, CBRAM, PRAM, FeRAM, NVRAM, MRAM, RRAM, SONOS, FJG RAM, Millipede memory, racetrack memory, the like, or combinations thereof.

Figure 2:
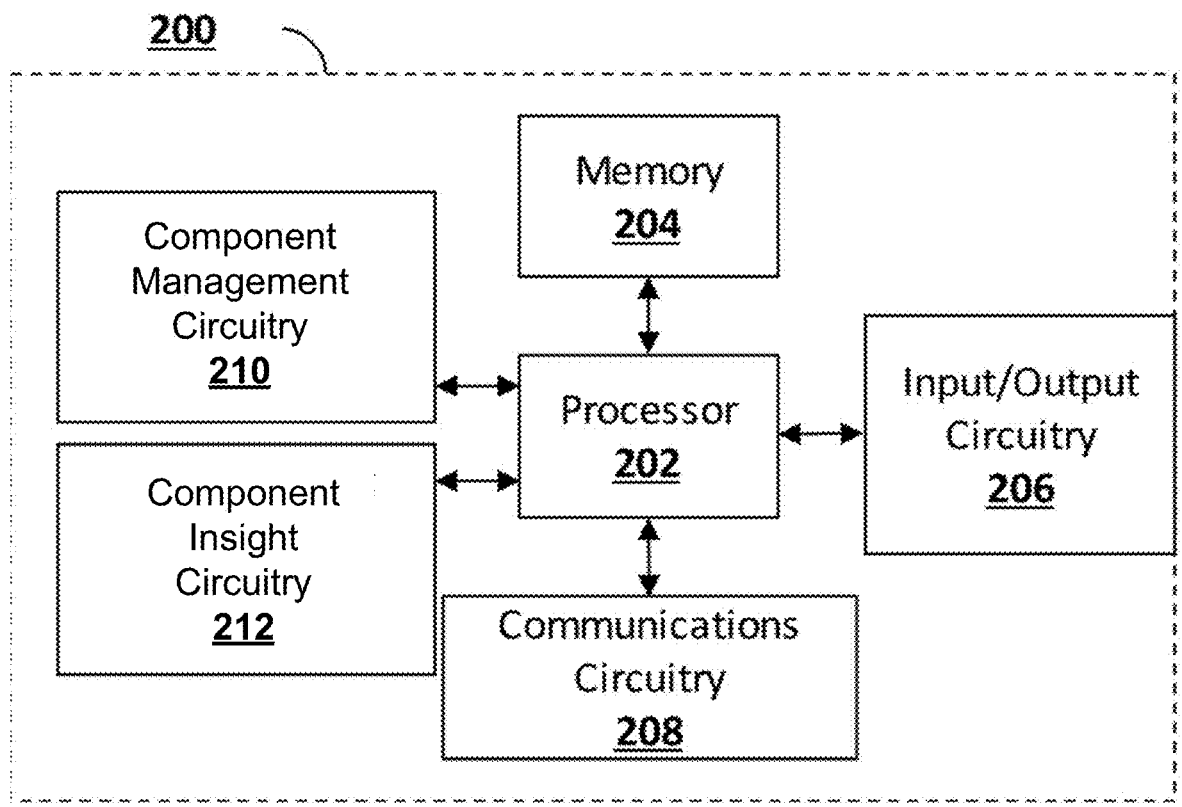
FIG. 2 is a block diagram of an example component management apparatus configured in accordance with one or more embodiments of the present disclosure.

The component management server 106 may be embodied by one or more computing systems, such as apparatus 200 shown in FIG. 2. The apparatus 200 may include processor 202, memory 204, input/output circuitry 206, communications circuitry 208, component management circuitry 210, and component insight circuitry 212. The apparatus 200 may be configured to execute the operations described herein. Although these components 202-212 are described with respect to functional limitations, it should be understood that the particular implementations necessarily include the use of particular hardware. It should also be understood that certain of these components 202-212 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present disclosure.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure the processor 202 to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display, and may comprise a web user interface, a mobile application, a query-initiating computing device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communications circuitry 208 may include the circuitry for interacting with the antenna/antennae to cause transmission of signals via the antenna/antennae or to handle receipt of signals received via the antenna/antennae.

The component management circuitry 210 may be any means such as a device or circuitry embodied in either hardware or a combination of hardware and software that is configured to manage one or more interaction vector data structure requests and/or relate processes associated with the one or more client devices 102A-C. In one or more embodiments, the component management circuitry 210 may be configured to receive one or more interaction vector data structure requests from the one or more client devices 102A-C. Additionally, in one or more embodiments, the component management circuitry 210 may be configured to retrieve metadata associated with one or more component identifiers included in the one or more interaction vector data structure requests. The one or more component identifiers may, for example, identify one or more components. Furthermore, in one or more embodiments, the metadata may include respective component object identifiers for the one or more component identifiers. In some embodiments, the metadata provides data associated with relationships, sources, targets, ownership, consumption, libraries, activities, attributes, incidents, communication channels, dashboards, data repositories, labels, descriptions, and/or other data related to the one or more component identifiers.

The component insight circuitry 212 may be any means such as a device or circuitry embodied in either hardware or a combination of hardware and software that is configured to determine data for one or more interaction vector data structures and/or to determine one or more insights for the one or more components associated with the one or more component identifiers. For instance, in one or more embodiments, the component insight circuitry 212 may be configured to traverse a component dependency work graph structure based on respective component object identifiers for the one or more component identifiers. In one or more embodiments, the component insight circuitry 212 may be configured to traverse the component dependency work graph structure to generate one or more interaction vector data structures based on one or more dependencies between one or more components associated with the one or more component identifiers. In some embodiments the component insight circuitry 212 is configured to ping one or more computing device associated with one or more components, such as via an internet control message protocol, to receive information related to the one or more components or computing devices (e.g., component object data, etc.). In some embodiments, to obtain component object data associated with one or more client devices and/or one or more components, the component management circuitry 210 utilizes the communications circuitry 208 to transmit one or more API calls to one or more API servers associated with the noted client devices.

In some embodiments the component insight circuitry 212 is configured store received information in the component object repository 107. In some embodiments, the component object repository 107 may comprise one or more of a single unified repository, a single partitioned repository, or a plurality of isolated repositories comprising one or more partitions. An example embodiment of component object repository 107 may comprise separate partitions for isolating sensitive information, for example, classified government data. The component insight circuitry 212 may also be configured to generate access logs and/or historical data including all information previously retrieved that is associated with a particular user, computing device, component, the like, or combinations thereof. Historical data may include component dependency work graph data records for a particular time interval. For example, when the component dependency work graph data structure is generated in relation to a particular component this may be the initial time for the component dependency work graph data structure. As the component dependency work graph data structure is maintained for the component and all dependencies thereof any modifications to the component dependency work graph data structure may be recorded with a time dimension. For example, if a component object is removed or replaced in the component dependency work graph data structure the time at which this modification occurs would be associated with a time dimension. This time dimension can then be used to review a component dependency work graph data structure for any given point of time in the past up to the initial start time associated with the component dependency work graph data structure.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

Figure 3A:
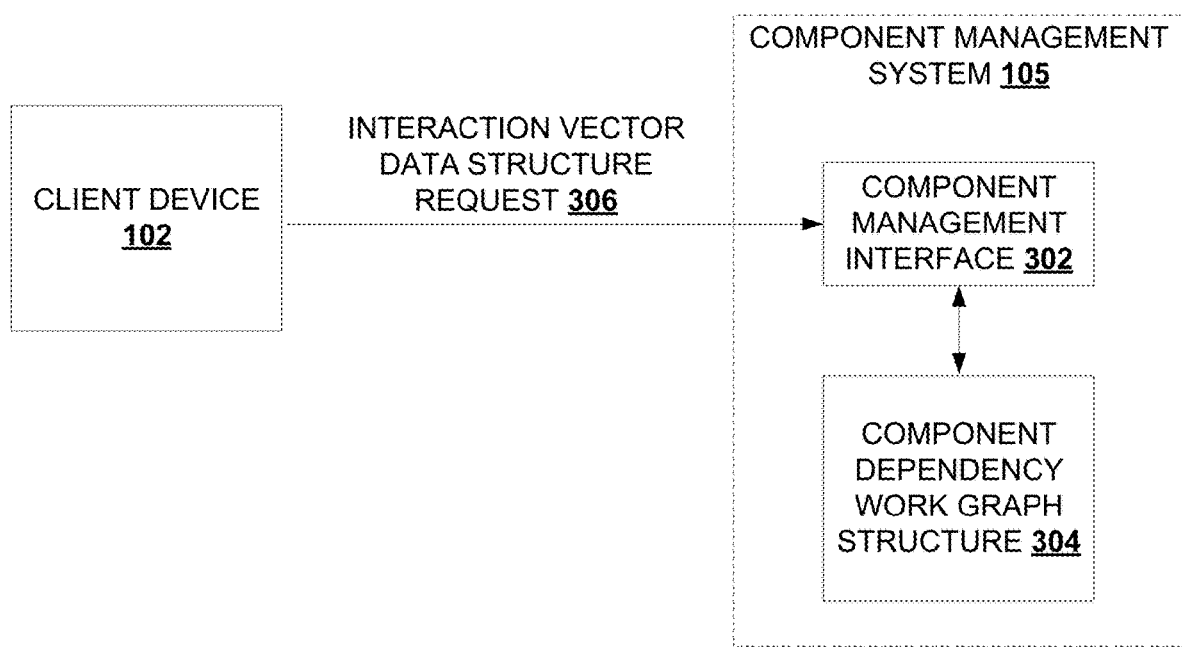
FIG. 3A illustrates an example system in accordance with one or more embodiments of the present disclosure.

Referring to FIG. 3A, an example system 300 is presented in accordance with one or more embodiments of the present disclosure. The system 300 includes a client device 102 (e.g., a client device from the one or more client devices 102A-C) and the component management system 105. In one or more embodiments, the component management system 105 includes a component management interface 302 and/or a component dependency work graph structure 304. The component management interface 302 may be, for example, a computing interface that facilitates exchange of data between the client device 102 and the component management system 105. In one or more embodiments, the component management interface 302 may facilitate management of components and/or insights related to components associated with the client device 102. In an embodiment, the component management interface 302 may be an API (e.g., a component management API) that facilitates exchange of data between the client device 102 and the component management system 105. For instance, in an embodiment, the component management interface 302 may be an API (e.g., a component management API) to facilitate management of components and/or insights related to components associated with the client device 102. In one or more embodiments, an API (e.g., a component management API) can be an interface that is consumed and/or employed by one or more systems (e.g., one or more of the client devices 102A-C and/or the component management system 105).

In an embodiment, the client device 102 may provide an interaction vector data structure request 306 to the component management system 105. For instance, in an embodiment, the interaction vector data structure request 306 provided by the client device 102 may be received by the component management interface 302 of the component management system 105. In one or more embodiments, the client device 102 may transmit the interaction vector data structure request 306 to the component management system 105 via the network 104. The interaction vector data structure request 306 may include one or more interaction vector identifiers and/or one or more component identifiers. In one or more embodiments, the interaction vector data structure request 306 may be an API call. Based on the interaction vector data structure request 306 received via the component management interface 302, the component management system 105 (e.g., the component management circuitry 210) may retrieve metadata associated with the one or more component identifiers. In one or more embodiments, the metadata may be retrieved from the component object repository 107. The metadata may include, in one or more embodiments, respective component object identifiers for the one or more component identifiers. Additionally, the component management system 105 (e.g., the component insight circuitry 212) may traverse the component dependency work graph structure 304 based on the respective component object identifiers. For instance, in one or more embodiments, the component management system 105 (e.g., the component insight circuitry 212) may traverse the component dependency work graph structure 304 to generate one or more interaction vector data structures based on one or more dependencies between one or more components associated with the one or more component identifiers.

The component dependency work graph structure 304 may be a data structure configured to represent dependency relationships between components. For example, component dependency work graph structure 304 may comprise component objects and/or component object dependencies that represent contextual information, relationships, mappings, categorizations, ownership, linking to tools, structured metadata, networks of communication, data organization, computing devices, data exchanged, libraries, features, executable code, interconnection of components, the like, or combinations thereof for a plurality of components employed by an application and/or the client device 102. In some embodiments, component objects are represented by nodes of the component dependency work graph structure. In some embodiments, component dependency objects are represented by edges of the component dependency work graph structure. In some embodiments, the component dependency work graph structure can comprise one or more weighted graphs, multigraphs, isomorphic graphs, trees, the like, or combinations thereof.

Figure 3B:
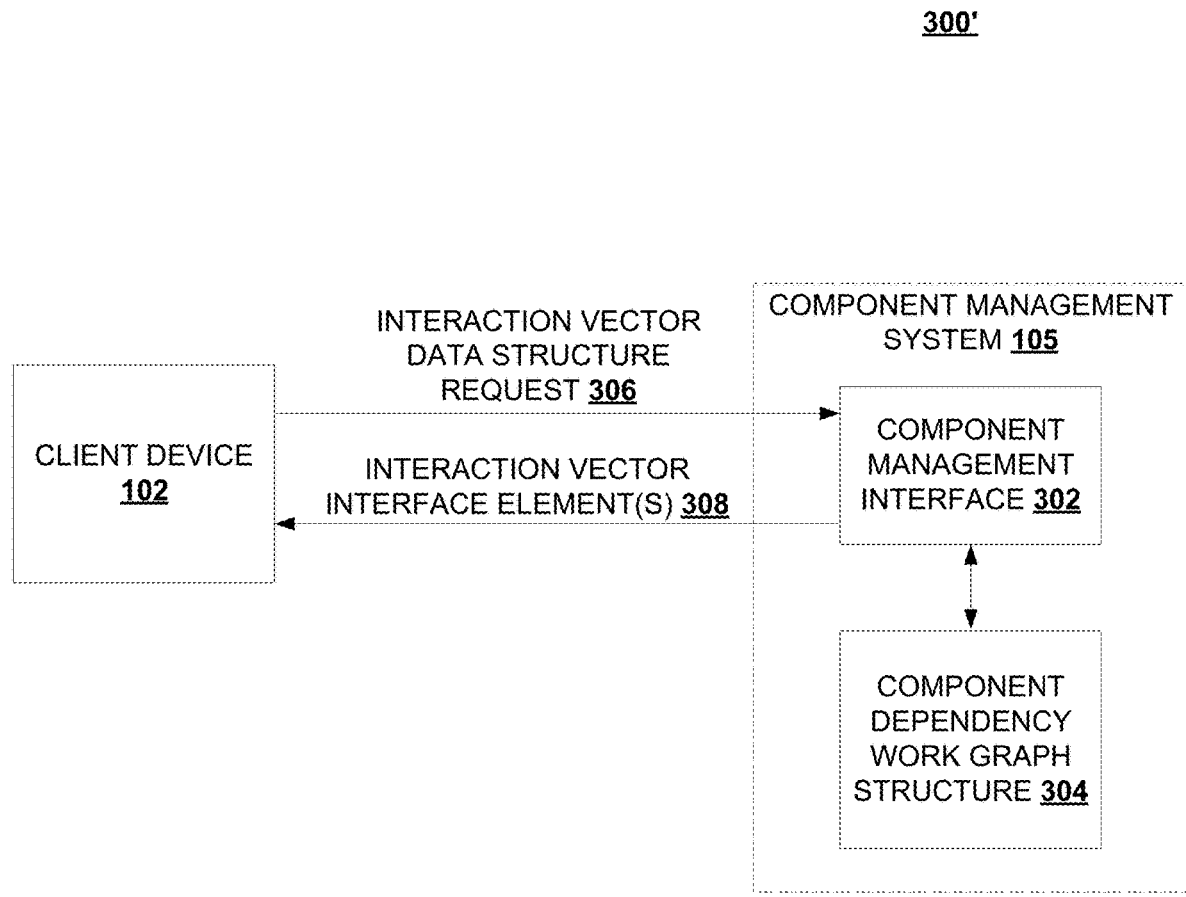
FIG. 3B illustrates another example system in accordance with one or more embodiments of the present disclosure

Referring now to FIG. 3B, an example system 300' is presented in accordance with one or more embodiments of the present disclosure. In one or more embodiments, the system 300' illustrates an alternate embodiment of the system 300. The system 300' includes the client device 102 and the component management system 105. In one or more embodiments, the component management system 105 includes the component management interface 302 and/or the component dependency work graph structure 304. In one or more embodiments, in response to the interaction vector data structure request 306, the component management system 105 (e.g., the component insight circuitry 212) may determine interaction vector interface element(s) 308 associated with the one or more interaction vector data structures. In one or more embodiments, the component management system 105 may provide the interaction vector interface element(s) 308 to the client device 102. For instance, in an embodiment, the component management system 105 may provide the interaction vector interface element(s) 308 to the client device 102 via the component management interface 302. In one or more embodiments, the component management system 105 may transmit the interaction vector interface element(s) 308 to the client device 102 via the network 104.

In one or more embodiments, the interaction vector interface element(s) 308 may be configured to render visualization of one or more insights related to the one or more components via an electronic interface of the client device 102. In one or more embodiments, the one or more insights associated with the interaction vector interface element(s) 308 may include contextual information associated with the one or more components, one or more relationships associated with the one or more components, one or more dependencies associated with the one or more components, one or more mappings associated with the one or more components, one or more categorizations associated with the one or more components, one or more groupings associated with the one or more components, tracking of ownership associated with the one or more components, linking between the one or more components and one or more other tools, structured metadata associated with the one or more components, incident investigation information associated with the one or more components, change management information associated with the one or more components, analytics information associated with the one or more components, one or more component scorecards associated with the one or more components, and/or one or more other insights associated with the one or more components.

In one or more embodiments, the interaction vector interface element(s) 308 may describes one or more inferred properties about an event (e.g., a change event, an incident event, an analytics event etc.) associated with the components. For example, in response to a cluster of components associated with a group of data changes, the interaction vector interface element(s) 308 may include an incident signature that describes data objects and/or components associated with the changes. In another example, in response to a cluster of components associated with a group of data retrieval failures, the interaction vector interface element(s) 308 may include an incident signature that describes data objects in the cluster of components and/or describes that the multi-component system is experiencing a database failure and/or a network connection failure. An event may be associated with an event stream. An event stream may be, for example, a collection of events related to one or more components. In some embodiments, an event may be associated with a unique identifier, one or more attributes, one or more tags, one or more classifications, one or more source identifiers, one or more object types, and/or other context data to facilitate determining one or more inferred properties about the event. Additionally, in some embodiments, an event may be triggered via one or more components. For example, an event may be related to one or more changes and/or one or more incidents related to one or more components. In some embodiments, an event can be an incident event related to a client device (e.g., a client device from client devices 102A-C) such as, for example, a display screen event associated with a client device, a user interface event associated with the client device, a track change event, an operational change, etc. In an embodiment, a display screen event can be related to user navigation to a particular screen, tab, drawer model, inline-dialog and/or other display screen portion via a client device (e.g., a client device from client devices 102A-C). Furthermore, a display screen event can provide information regarding one or more paths taken via a display screen of a client device (e.g., a client device from client devices 102A-C) to perform one or more tasks via the client device. In some embodiments, a display screen event can be associated with identifiable information and/or user generated content to facilitate determining one or more inferred properties about the display screen event.

Figure 4:
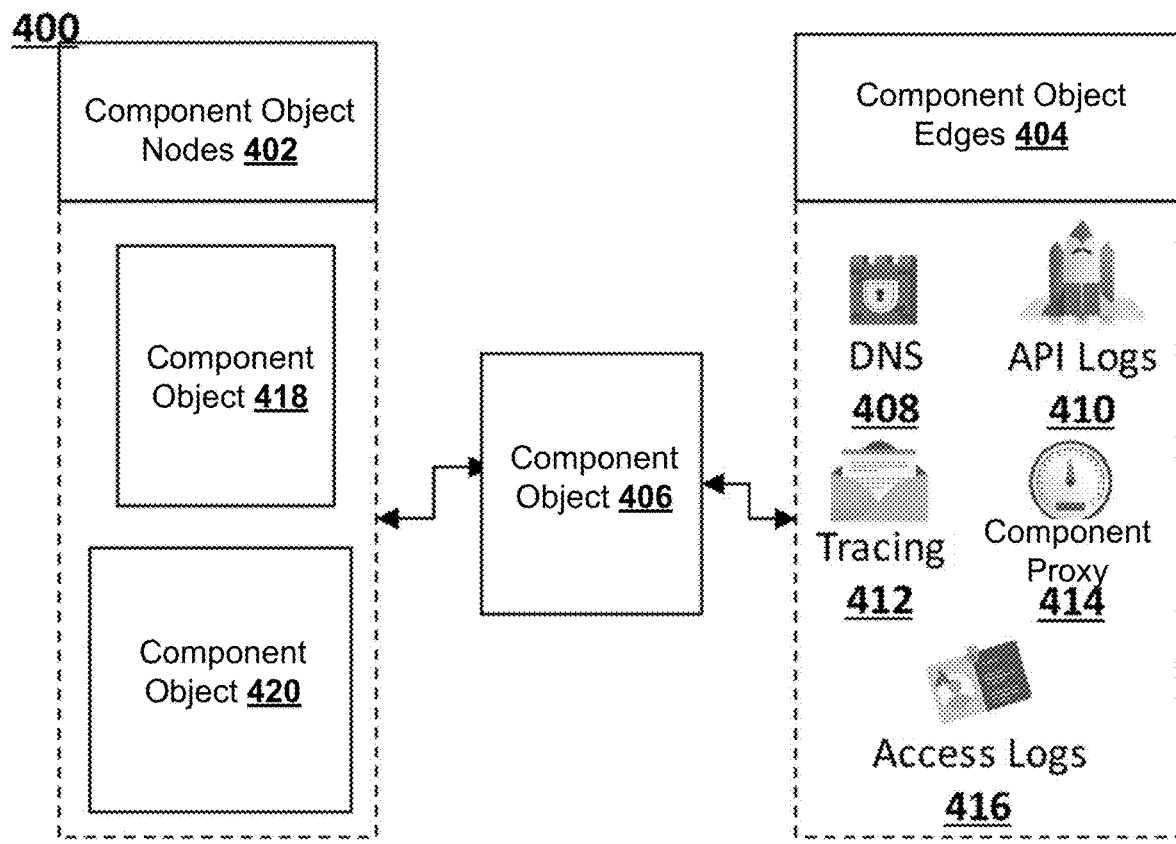
FIG. 4 is a block diagram of an example components dependent on other components and data sources in accordance with one or more embodiments of the present disclosure.

Referring now to FIG. 4, an example dependency data structure 400 is presented in accordance with one or more embodiments disclosed herein. The dependency data structure 400 may be a combination of one or more component objects and/or one or more component dependency objects within the component dependency work graph structure 304. In an embodiment, the dependency data structure 400 may include a component object 406 that represents a component associated with various component dependency objects. As shown, a component (e.g., a graph store) represented by the component object 406 is supported by, and communicably connected via at least a network, with a plurality of other components and data. The plurality of other components and data are represented by component object nodes 402 and component object edges 404 respectively. As such, the connections, between component object 406 and the plurality of component object nodes 402 and component object edges 404, represent one or more of a functional component interface provided to or from the component as represented by component object 406. The component object nodes 402 comprise component object 418 and component object 420, each representing a respective component, which may be configured to receive information signals from and/or transmit information signals to the component associated with component object 406. Component object 418 represents a component that may be called by another component (e.g., the component represented by component object 406) to fetch information about one or more additional components. Component object 420 represents an open source tool to declare APIs.

Moreover, the component associated with component object 406 is further associated with a plurality of component object data as represented by component object edges 404. Each of component object edges 404 may contribute one or more data structures to component object 406. The component object edges 404, as shown, may comprise one or more of domain name system (DNS) lookup 408, application programming interface (API) logs 410, tracing 412, component proxy 414, and access logs 416.

Referring now to FIG. 5, example component dependency system work graph 500 is presented which illustrates an operational example of a component dependency work graph structure 504 and a components list 502 in accordance with at least some embodiments of the present disclosure. As shown, components list 502 comprises component objects 502A-C associated with components A-C (not shown) respectively. It should be appreciated that, as shown, component objects 502A-C may be represented by icons configured from the underlying data in component dependency system work graph 500 such that a user may be presented with additional component object data for components A-C by interacting with one or more of component objects 502A-C. For example, as illustrated, an input signal 512 is received by component dependency system work graph 500 in relation to component object 502A and, in response, component insight circuitry 212 may retrieve additional component object data 512A. The additional component object data 512A from component dependency system work graph 500 is represented by way of components list 502. According to some embodiments, additional component object data 512A may be configured as a graphical icon, textual information, empirical data, another components list, a pop-up window, a data tree structure, the like, or combinations thereof.

An example embodiment of components list 502 may include components objects 502A-C configured as 'Component-One,' 'Component-Two,' and 'Component-Three' respectively. Each of 'Component-One,' 'Component-Two,' 'Component-Three' may further comprise respective attributes. The attributes comprising an array of name and/or value pairs with properties associated with the underlying component. For example, component object 502A may be identified as 'Component-One' in components list 502, 'Component-One' being the name of the underlying component represented by component object 502A, with additional component object data 512A associated therewith. In such an example, additional component object data 512A may comprise a first attribute such as 'tier=0' to identify 'Component-One' as having a given priority or component level associated with a tier of 0. Additionally, component object 502A associated with 'Component-One' may further comprise a second attribute. For example, component object 502A may identify 'Component-One' as an internal component or an external component via the second attribute, for example, the additional component object data may include the attribute 'author=internal' for 'Component-One.' Moreover, component object 502B may be named 'Component- Two,' after the underlying represented component, and may comprise similar attributes of 'tier=1' and 'author=internal.' The first attribute of 'tier=1' to identify 'Component-Two' as having a given priority or component level associated with a tier of 1 and the second attribute, 'author=internal,' denoting 'Component-Two' as an internal component.

As further shown in FIG. 5, components list 502 may be presented and coordinated with component dependency work graph structure 504. The example component dependency work graph structure 504 as depicted illustrates component dependency work graph nodes 506A-C, each representing a respective component A-C (not shown), and associated with component objects 502A-C respectively. The component dependency work graph structure 504 may represent a plurality of component dependencies. For example, component dependency work graph node 506A, that represents component A (not shown), is depicted as being dependently connected to component dependency work graph node 506B, that represents component B (not shown), by way of component dependency work graph edge 508, that represents the dependency relationship between component A and component B. Additionally, component dependency work graph node 506B is shown as being dependently connected to component dependency work graph node 506C, that represents component C (not shown), by way of component dependency work graph edge 510, that represents the dependency relationship between component B and component C. It should be appreciated that data may be transmitted and received bi-directionally by way of the connectivity represented by component dependency work graph edges 508 and 510. For example, component B may both send data to and receive data from component C in order to provide functionality to and/or receive functional components from component C. In some embodiments, component dependency work graph edges 508 and 510 may represent a plurality of component dependencies between their respective components, represented by component dependency work graph nodes 506A-C.

It should be appreciated that as input signals (e.g., input signal 512) are provided to component objects 502A-C the component dependency work graph structure 504 may change in appearance accordingly. It should be appreciated that input signals (e.g., input signal 512) may be provided via an API between applications, a user interface, the like, or combinations thereof. For example, as input signal 512 is received by component dependency system work graph 500, via component object 502A, and in response component object data 512A is displayed in components list 502 a coordinated response (not shown) may be displayed by component dependency work graph structure 504, such that additional component dependency work graph nodes may be represented in the component dependency work graph structure 504. Moreover, the additional component dependency work graph nodes may correspond to the components represented by component object data 512A in much the same way, as described herein, that component dependency work graph node 506A and component object 502A correspond to each other and underlying component A. In some embodiments, component dependency work graph structure 504 or components list 502 can be modified by component dependency system work graph 500 without inputs signals received via a user interface.

According to some embodiments, at least portions of components list 502 and the component dependency work graph structure 504 may be combined such that component dependency work graph nodes 506A-C are further configured to function in accordance with at least some of the functionality described herein with respect to component objects 502A-C. In such embodiments, components list 502, components thereof, and/or any functionality attributed thereto may be at least partially removed from example component dependency system work graph 500. It will be further appreciated that any portion of component dependency system work graph 500 may be configured to receive one or more input signals (e.g., input signal 512) to send/receive data to/from one or more components as described in reference to apparatus 200 and/or 300.

FIG. 6 is a flowchart diagram of an example process 600, for generating interaction vector data structures associated with a component management system, in accordance with, for example, component management system 105. Via the various operations of process 600, the component management server 106, or the like, of the component management system 105 can enhance efficiency, reliability and/or effectiveness of determining insights with respect to data associated with components of a multi-component system.

The process 600 begins at operation 602 where an interaction vector data structure request for a component management system is received from a client device. The interaction vector data structure request comprises one or more interaction vector identifiers and one or more component identifiers. For example, the one or more interaction vector identifiers may facilitate initiation of one or more insight processes to generate data for one or more interaction vector data structures and/or to obtain one more insights for one or more components associated with the one or more component identifiers. The one or more component identifiers may identify one or more components.

At operation 604, metadata associated with the one or more component identifiers is retrieved, wherein the metadata comprises respective component object identifiers for the one or more component identifiers. In one or more embodiments, the metadata can be retrieved based on one or more component names associated with the one or more component identifiers. In one or more embodiments, the one or more component names can correspond to input data provided to a search graphical control element associated with the electronic interface of the client device.

At operation 606, a component dependency work graph structure is traversed based on the respective component object identifiers to generate one or more interaction vector data structures based on one or more dependencies between component object data associated with the respective component object identifiers. In one or more embodiments, the one or more interaction vector data structures can be generated based on a mapping of the component object data associated with the respective component object identifiers. In one or more embodiments, the one or more interaction vector data structures can be generated based on ownership data for the component object data associated with the respective component object identifiers. In one or more embodiments, the one or more interaction vector data structures can be generated based on timestamp data for the component object data associated with the respective component object identifiers. For example, in one or more embodiments, the interaction vector data structures can aggregate data for components based on time series queries and/or other time data associated with the components. In one or more embodiments, the one or more interaction vector data structures can be generated based on one or more changes with respect to the component object data associated with the respective component object identifiers. In one or more embodiments, the one or more interaction vector data structures can be generated based on one or more incident events with respect to the component object data associated with the respective component object identifiers. In one or more embodiments, one or more incomplete portions of the metadata are identified based on the component dependency work graph structure.

At operation 608, one or more interaction vector interface elements representative of the one or more interaction vector data structures are transmitted to the client device, where the one or more interaction vector interface elements are configured to graphically render the one or more interaction vector data structures via an electronic interface of the client device. In one or more embodiments, the one or more interaction vector interface elements can be configured to render visualization of the mapping of the component object data associated with the respective component object identifiers via the electronic interface of the client device. In one or more embodiments, the one or more interaction vector interface elements can be generated based on information associated with the one or more incomplete portions of the metadata.

FIG. 7 is a flowchart diagram of an example process 700, for providing one or more interaction vector interface elements via a client device, in accordance with, for example, client device 102. Via the various operations of process 700, the client device 102, or the like, can enhance efficiency, reliability and/or effectiveness of determining insights with respect to data associated with components of a multi-component system.

The process 700 begins at operation 702 where an interaction vector data structure request is generated for a component management system. The interaction vector data structure request comprises one or more interaction vector identifiers and one or more component identifiers. For example, the one or more interaction vector identifiers may facilitate initiation of one or more insight processes to generate data for one or more interaction vector data structures and/or to obtain one more insights for one or more components associated with the one or more component identifiers. The one or more component identifiers may identify one or more components. In one or more embodiments, the interaction vector data structure request is generated via a search graphical control element of the electronic interface (e.g., a user interface).

At operation 704, in response to the interaction vector data structure request, one or more interaction vector interface elements representative of one or more interaction vector data structures generated based on the one or more interaction vector identifiers and the one or more component identifiers are received. For example, a component management system (e.g., the component management system 105) may employ the one or more interaction vector identifiers and the one or more component identifiers to determine the one or more interaction vector interface elements.

At operation 706, a visualization of the one or more interaction vector interface elements is rendered via an electronic interface. In one or more embodiments, a user interface associated with the electronic interface is generated to facilitate presentation of the visualization of the one or more interaction vector interface elements. In one or more embodiments, the visualization of the one or more interaction vector interface elements may include one or more insights for the one or more components, contextual information for the one or more components, one or more relationships between the one or more components, one or more dependencies between the one or more components, one or more mappings related to the one or more components, one or more categorizations related to the one or more components, one or more groupings related to the one or more components, tracking of ownership of the one or more components, linking between the one or more components and one or more other tools, structured metadata related to the one or more components, incident investigation information related to the one or more components, change management information related to the one or more components, analytics information related to the one or more components, one or more component scorecards related to the one or more components, and/or one or more other insights related to the one or more components.

Although example processing systems have been described in the figures herein, implementations of the subject matter and the functional operations described herein can be implemented in other types of digital electronic circuitry, or in computer software, firmware, or hardware, including the structures disclosed in this specification and their structural equivalents, or in combinations of one or more of them.

Referring to now FIG. 8, an example user interface 800 is presented in accordance with one or more embodiments of the present disclosure. The user interface 800 can be, for example, an electronic interface (e.g., a graphical user interface) of a client device (e.g., the client device 102). In one or more embodiments, the user interface 800 includes a search graphical control element 802. The search graphical control element 802 can facilitate a search with respect to one or more insights for one or more components of an application framework. For instance, a name of a component and/or a type of component can be provided to the search graphical control element 802 (e.g., via user input data) to initiate an insight process to obtain one or more insights associated with the components and/or one or more other components. In one or more embodiments, the search graphical control element 802 can initiate generation of the interaction vector data structure request 306. In one or more embodiments, the search graphical control element 802 facilitates a request to register a component with a component management system. In one or more embodiments, the user interface 800 provides visualization of component data 804 related to a component (e.g., a name of a component) associated with the search graphical control element 802. In one or more embodiments, the component data 804 displays information related to one or more components that match a textual string provided to the search graphical control element 802.

In one or more embodiments, the user interface 800 additionally or alternatively provides visualization of interaction vector interface element 806 related to a component (e.g., a name of a component) associated with the search graphical control element 802. The interaction vector interface element 806 can include one or more interaction vector interface elements. Furthermore, the interaction vector interface element 806 can include, for example, one or more insights for one or more components associated with the component data 804. In one or more embodiments, the interaction vector interface element 806 can cluster and/or group different types of insights to facilitate visualization of the interaction vector interface element 806. In one or more embodiments, the one or more insights associated with the interaction vector interface element 806 may include contextual information for one or more components associated with the component data 804, one or more relationships between one or more components associated with the component data 804, one or more dependencies between one or more components associated with the component data 804, one or more mappings related to one or more components associated with the component data 804, one or more categorizations related to one or more components associated with the component data 804, one or more groupings related to one or more components associated with the component data 804, tracking of ownership of one or more components associated with the component data 804, linking between the one or more components associated with the component data 804 and one or more other tools, structured metadata related to one or more components associated with the component data 804, incident investigation information related to one or more components associated with the component data 804, change management information related to one or more components associated with the component data 804, analytics information related to one or more components associated with the component data 804, one or more component scorecards related to one or more components associated with the component data 804, and/or one or more other insights related to one or more components associated with the component data 804.

In one or more embodiments, the interaction vector interface element 806 facilitates visualization of a list of components via a component list view that is grouped and/or ranked by name, type, tier, and/or owner. In one or more embodiments, the interaction vector interface element 806 can be filtered via the user interface 800 based on name, type, tier, and/or owner. In one or more embodiments, the interaction vector interface element 806 provides insights related to project association and/or repository association for components. In one or more embodiments, the interaction vector interface element 806 provides visualization of a component scoreboard to score individual components and/or to assign ownership, add documentation link, add runbook link, add dashboard link, add communication channel, create dependencies, etc. In one or more embodiments, the component scorecard quantifies an amount of data associated with a component (e.g., 0% corresponds to no critical metadata associated with a component and 100% corresponds to all critical metadata associated with a component). In an embodiment, the critical metadata can be determined based on assigned ownership, description, a project link, a repository link, a runbook link, a documentation link, a dashboard link, communication channel information, and/or other information. In one or more embodiments, the interaction vector interface element 806 provides visualization of structured metadata based on documentation links, runbook links, dashboard links, and/or communication channels.

In one or more embodiments, the user interface 800 facilitates onboarding to create components, create teams for the components, and/or invite team members for the components. In one or more embodiments, the user interface 800 facilitates creating, viewing, updating, and/or deleting data associated with components. In one or more embodiments, the user interface 800 facilitates creating a component based on component information such as, for example, type, name, tier, owner, and/or a universally unique identifier (UUID). In one or more embodiments, the user interface 800 facilitates user interface navigation and/or interaction with extensibility points. In one or more embodiments, the user interface 800 may facilitate a process to allow user to sign-up to an application framework. In one or more embodiments, the user interface 800 may facilitate providing an onboarding experience with respect to components.

Referring to now FIG. 9, an example user interface 900 is presented in accordance with one or more embodiments of the present disclosure. The user interface 900 can be, for example, an electronic interface (e.g., a graphical user interface) of a client device (e.g., the client device 102). In one or more embodiments, the user interface 900 includes a search graphical control element 902. The search graphical control element 902 can facilitate a search with respect to one or more insights for one or more components of an application framework. For instance, a name of a component and/or a type of component can be provided to the search graphical control element 902 (e.g., via user input data) to initiate an insight process to obtain one or more insights associated with the components and/or one or more other components. In one or more embodiments, the search graphical control element 902 can initiate generation of the interaction vector data structure request 306. In one or more embodiments, the search graphical control element 902 facilitates a request to register a component with a component management system. In one or more embodiments, the user interface 900 provides visualization of component data 904 related to a component (e.g., a name of a component) associated with the search graphical control element 902. In one or more embodiments, the component data 904 displays information related to one or more components that match a textual string provided to the search graphical control element 902. In one or more embodiments, the search graphical control element 902 is configured to, in response to receiving electronic interactions via the interface by a computing device, initiate an interaction vector data structure request to facilitate generation of one or more interaction vector interface elements configured to graphically render an interaction vector data structure associated with a query (e.g., a string of text) provided to the search graphical control element 902.

Referring to now FIG. 10, an example user interface 1000 is presented in accordance with one or more embodiments of the present disclosure. The user interface 1000 can be, for example, an electronic interface (e.g., a graphical user interface) of a client device (e.g., the client device 102). In one or more embodiments, the user interface 1000 includes a search graphical control element 1002. The search graphical control element 1002 can facilitate a search with respect to one or more insights for one or more components of an application framework. For instance, a name of a component and/or a type of component can be provided to the search graphical control element 1002 (e.g., via user input data) to initiate an insight process to obtain one or more insights associated with the components and/or one or more other components. In one or more embodiments, the search graphical control element 1002 can initiate generation of the interaction vector data structure request 306. In one or more embodiments, the search graphical control element 1002 facilitates a request to register a component with a component management system.

In one or more embodiments, the user interface 1000 provides visualization of interaction vector interface element 1006 related to a component (e.g., a name of a component) associated with the search graphical control element 1002. The interaction vector interface element 1006 can include one or more interaction vector interface elements. Furthermore, the interaction vector interface element 1006 can include, for example, one or more insights for one or more components. In one or more embodiments, the interaction vector interface element 1006 can cluster and/or group different types of insights to facilitate visualization of the interaction vector interface element 1006. In one or more embodiments, the one or more insights associated with the interaction vector interface element 1006 may include contextual information for one or more components, one or more relationships between one or more components, one or more dependencies between one or more components, one or more mappings related to one or more components, one or more categorizations related to one or more components, one or more groupings related to one or more components, tracking of ownership of one or more components, linking between the one or more components and one or more other tools, structured metadata related to one or more components, incident investigation information related to one or more components, change management information related to one or more components, analytics information related to one or more components, one or more component scorecards related to one or more components, and/or one or more other insights related to one or more components. In one or more embodiments, the interaction vector interface element 1006 facilitates visualization of a list of components via a component list view that is grouped and/or ranked by name, type, tier, and/or owner. In one or more embodiments, the interaction vector interface element 1006 can be filtered via the user interface 1000 based on name, type, tier, and/or owner. In one or more embodiments, the interaction vector interface element 1006 provides insights related to project association and/or repository association for components.

In one or more embodiments, the interaction vector interface element 1006 is configured to render a ranking of interaction vector interface elements via the user interface 1000. For instance, in one or more embodiments, the component management system 105 can be configured to rank interaction vector interface elements for rendering as a ranked list of interaction vector interface elements via the user interface 1000 based on insights for respective interaction vector data structures of the interaction vector interface elements. In one or more embodiments, the user interface 1000 (e.g., the interaction vector interface element 1006) includes a ranked interaction vector list interface element 1008 that renders a ranking of interaction vector interface elements. In one or more embodiments, the component management system 105 reconfigures the user interface 1000 to provide the ranked interaction vector list interface element 1008 that renders a ranked list of interaction vector interface elements. The insights determined by the component management system 105 for the respective interaction vector data structures include contextual information for the respective interaction vector data structures, one or more relationships between the respective interaction vector data structures, one or more dependencies between the respective interaction vector data structures, one or more mappings related to the respective interaction vector data structures, one or more categorizations related to the respective interaction vector data structures, ownership of the respective interaction vector data structures, linking between the respective interaction vector data structures, structured metadata related to the respective interaction vector data structures, incident investigation information related to the respective interaction vector data structures, change management information related to the respective interaction vector data structures, analytics information related to the respective interaction vector data structures, one or more component scorecards related to the respective interaction vector data structures, and/or one or more other insights related to the respective interaction vector data structures. In one or more embodiments, the ranked interaction vector list interface element 1008 is configured for rendering in relation to one or more interface areas (e.g., the search graphical control element 1002, one or more other portions of the interaction vector interface element 1006) via the electronic interface 1000. In an embodiment, the ranked interaction vector list interface element 1008 can include a ranking of interaction vector interface elements based on respective client identifiers. For example, the ranked interaction vector list interface element 1008 can include a first interaction vector interface element associated with a first client identifier (e.g., Owner A), a second interaction vector interface element associated with a second client identifier (e.g., Owner B), a third interaction vector interface element associated with a third client identifier (e.g., Owner B), etc.

In one or more embodiment, the interaction vector interface element 1006 is configured to additionally or alternatively render a grouping of two or more of the interaction vector interface elements via the user interface 1000. For instance, in one or more embodiments, the component management system 105 can be configured to group of two or more of the interaction vector interface elements based on a comparison between respective interaction vector data structures of the two or more of the interaction vector interface elements. Furthermore, in one or more embodiments, the component management system 105 reconfigures the user interface 1000 to provide a grouping of two or more of the interaction vector interface elements via the user interface 1000. The comparison between respective interaction vector data structures can include, for example, comparison between contextual information for the respective interaction vector data structures, comparison of categorizations related to the respective interaction vector data structures, ownership of the respective interaction vector data structures, comparison between structured metadata related to the respective interaction vector data structures, comparison between incident investigation information related to the respective interaction vector data structures, comparison between change management information related to the respective interaction vector data structures, comparison between analytics information related to the respective interaction vector data structures, comparison between one or more component scorecards related to the respective interaction vector data structures, and/or comparison between one or more other insights related to the respective interaction vector data structures.

Referring to now FIG. 11, an example user interface 1100 is presented in accordance with one or more embodiments of the present disclosure. The user interface 1100 can be, for example, an electronic interface (e.g., a graphical user interface) of a client device (e.g., the client device 102). In one or more embodiments, the user interface 1100 includes a search graphical control element 1102. The search graphical control element 1102 can facilitate a search with respect to one or more insights for one or more components of an application framework. For instance, a name of a component and/or a type of component can be provided to the search graphical control element 1102 (e.g., via user input data) to initiate an insight process to obtain one or more insights associated with the components and/or one or more other components. In one or more embodiments, the search graphical control element 1102 can initiate generation of the interaction vector data structure request 306. In one or more embodiments, the search graphical control element 1102 facilitates a request to register a component with a component management system.

In one or more embodiments, the user interface 1100 provides visualization of interaction vector interface element 1106 related to a component (e.g., a name of a component) associated with the search graphical control element 1102. In one or more embodiments, the interaction vector interface element 1106 provides visualization of a component scoreboard to score individual components and/or to assign ownership, add documentation link, add runbook link, add dashboard link, add communication channel, create dependencies, etc. In one or more embodiments, the component scorecard quantifies an amount of data associated with a component (e.g., 0% corresponds to no critical metadata associated with a component and 100% corresponds to all critical metadata associated with a component). In an embodiment, the critical metadata can be determined based on assigned ownership, description, a project link, a repository link, a runbook link, a documentation link, a dashboard link, communication channel information, and/or other information. In one or more embodiments, the interaction vector interface element 1106 provides visualization of structured metadata based on documentation links, runbook links, dashboard links, and/or communication channels.

Referring to now FIG. 12, an example user interface 1200 is presented in accordance with one or more embodiments of the present disclosure. The user interface 1200 can be, for example, an electronic interface (e.g., a graphical user interface) of a client device (e.g., the client device 102). In one or more embodiments, the user interface 1200 includes a search graphical control element 1202. The search graphical control element 1202 can facilitate a search with respect to one or more insights for one or more components of an application framework. For instance, a name of a component and/or a type of component can be provided to the search graphical control element 1202 (e.g., via user input data) to initiate an insight process to obtain one or more insights associated with the components and/or one or more other components. In one or more embodiments, the search graphical control element 1202 can initiate generation of the interaction vector data structure request 306. In one or more embodiments, the search graphical control element 1202 facilitates a request to register a component with a component management system. In one or more embodiments, the user interface 1200 provides an interface portion 1206 that facilitates onboarding to create components, create teams for the components, and/or invite team members for the components. In one or more embodiments, the interface portion 1206 facilitates creating, viewing, updating, and/or deleting data associated with components. In one or more embodiments, the interface portion 1206 facilitates creating a component based on component information such as, for example, type, name, tier, owner, and/or a UUID. In one or more embodiments, the interface portion 1206 is configured to facilitate generation of new component object data for a new component identifier. Furthermore, the new component object data generated via the interface portion 1206 can be added to a component dependency work graph structure (e.g., the component dependency work graph structure 304).

Referring to now FIG. 13, an example user interface 1300 is presented in accordance with one or more embodiments of the present disclosure. The user interface 1300 can be, for example, an electronic interface (e.g., a graphical user interface) of a client device (e.g., the client device 102). In one or more embodiments, the user interface 1300 includes a search graphical control element 1302. The search graphical control element 1302 can facilitate a search with respect to one or more insights for one or more components of an application framework. For instance, a name of a component and/or a type of component can be provided to the search graphical control element 1302 (e.g., via user input data) to initiate an insight process to obtain one or more insights associated with the components and/or one or more other components. In one or more embodiments, the search graphical control element 1302 can initiate generation of the interaction vector data structure request 306. In one or more embodiments, the search graphical control element 1302 facilitates a request to register a component with a component management system.

In one or more embodiments, the user interface 1300 provides visualization of interaction vector interface element 1306 related to a component (e.g., a name of a component) associated with the search graphical control element 1302. The interaction vector interface element 1306 can include one or more interaction vector interface elements. Furthermore, the interaction vector interface element 1306 can include, for example, one or more insights for one or more components. In one or more embodiments, the interaction vector interface element 1306 can cluster and/or group different types of insights to facilitate visualization of the interaction vector interface element 1306. In one or more embodiments, the one or more insights associated with the interaction vector interface element 1306 may include contextual information for one or more components, one or more relationships between one or more components, one or more dependencies between one or more components, one or more mappings between one or more components, and/or other information related to one or more components.

Referring to now FIG. 14, an example user interface 1400 is presented in accordance with one or more embodiments of the present disclosure. The user interface 1400 can be, for example, an electronic interface (e.g., a graphical user interface) of a client device (e.g., the client device 102). In one or more embodiments, the user interface 1400 includes a search graphical control element 1402. The search graphical control element 1402 can facilitate a search with respect to one or more insights for one or more components of an application framework. For instance, a name of a component and/or a type of component can be provided to the search graphical control element 1402 (e.g., via user input data) to initiate an insight process to obtain one or more insights associated with the components and/or one or more other components. In one or more embodiments, the search graphical control element 1402 can initiate generation of the interaction vector data structure request 306. In one or more embodiments, the search graphical control element 1402 facilitates a request to register a component with a component management system.

In one or more embodiments, the user interface 1400 provides visualization of interaction vector interface element 1406 related to a component (e.g., a name of a component) associated with the search graphical control element 1402. The interaction vector interface element 1406 can include one or more interaction vector interface elements. Furthermore, the interaction vector interface element 1406 can include, for example, one or more insights for one or more components. In one or more embodiments, the interaction vector interface element 1406 can cluster and/or group different types of insights to facilitate visualization of the interaction vector interface element 1406. In one or more embodiments, the one or more insights associated with the interaction vector interface element 1406 may include contextual information for one or more components, one or more relationships between one or more components, one or more dependencies between one or more components, one or more mappings related to one or more components, one or more categorizations related to one or more components, one or more groupings related to one or more components, tracking of ownership of one or more components, linking between the one or more components and one or more other tools, structured metadata related to one or more components, incident investigation information related to one or more components, change management information related to one or more components, analytics information related to one or more components, one or more component scorecards related to one or more components, and/or one or more other insights related to one or more components. In one or more embodiments, the user interface 1400 facilitates adding a communication channel, adding a name and/or an identifier to a document, adding a name and/or an identifier for a dashboard, adding metadata for a component, and/or visualizing dependencies between components.

Referring to now FIG. 15, an example user interface 1500 is presented in accordance with one or more embodiments of the present disclosure. The user interface 1500 can be, for example, an electronic interface (e.g., a graphical user interface) of a client device (e.g., the client device 102). In one or more embodiments, the user interface 1500 includes a search graphical control element 1502. The search graphical control element 1502 can facilitate a search with respect to one or more insights for one or more components of an application framework. For instance, a name of a component and/or a type of component can be provided to the search graphical control element 1502 (e.g., via user input data) to initiate an insight process to obtain one or more insights associated with the components and/or one or more other components. In one or more embodiments, the search graphical control element 1502 can initiate generation of the interaction vector data structure request 306. In one or more embodiments, the search graphical control element 1502 facilitates a request to register a component with a component management system.

In one or more embodiments, the user interface 1500 provides visualization of interaction vector interface element 1506 related to a component (e.g., a name of a component) associated with the search graphical control element 1502. The interaction vector interface element 1506 can include one or more interaction vector interface elements. Furthermore, the interaction vector interface element 1506 can include, for example, one or more insights for one or more components. In one or more embodiments, the interaction vector interface element 1506 can cluster and/or group different types of insights to facilitate visualization of the interaction vector interface element 1506. In one or more embodiments, the one or more insights associated with the interaction vector interface element 1506 may include contextual information for one or more components, one or more relationships between one or more components, one or more dependencies between one or more components, one or more mappings related to one or more components, one or more categorizations related to one or more components, one or more groupings related to one or more components, tracking of ownership of one or more components, linking between the one or more components and one or more other tools, structured metadata related to one or more components, incident investigation information related to one or more components, change management information related to one or more components, analytics information related to one or more components, one or more component scorecards related to one or more components, and/or one or more other insights related to one or more components. In one or more embodiments, the user interface 1500 facilitates adding a communication channel, adding a name and/or an identifier to a document, adding a name and/or an identifier for a dashboard, adding metadata for a component, and/or visualizing dependencies between components.

In one or more embodiments, the user interface 1500 (e.g., the interaction vector interface element 1506) includes a grouped interaction vector list interface element 1508. The grouped interaction vector list interface element 1508 is configured for rendering in relation to one or more interface areas (e.g., the search graphical control element 1502, one or more other portions of the interaction vector interface element 1506) via the electronic interface 1500. In an embodiment, the grouped interaction vector list interface element 1508 can include a grouping of interaction vector interface elements based on respective component usage. For example, the grouped interaction vector list interface element 1508 can include a first interaction vector interface element (e.g., "id-invitations-service") grouped with a second interaction vector interface element (e.g., "pf-directory-service"). In one or more embodiments, the component management system 105 reconfigures the user interface 1000 to provide the grouped interaction vector list interface element 1508 that a grouping of interaction vector interface elements.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web components, web services, web microservices, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's query-initiating computing device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a query-initiating computing device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., a Hypertext Markup Language (HTML) page) to a query-initiating computing device (e.g., for purposes of displaying information/data to and receiving user input from a user interacting with the query-initiating computing device). Information/data generated at the query-initiating computing device (e.g., a result of the user interaction) can be received from the query-initiating computing device at the server.

While this specification contains many specific implementation details, these should not be construed as limitations on the scope of any disclosures or of what may be claimed, but rather as description of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in incremental order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a product or packaged into multiple products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or incremental order, to achieve desirable results, unless described otherwise. In certain implementations, multitasking and parallel processing may be advantageous.

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed is:

1. A component management system, comprising one or more computers and one or more storage devices storing instructions that are operable, when executed by the one or more computers, to cause the one or more computers to:
receive, from a client device, an interaction vector data structure request generated based on a query provided to a search graphical control element associated with an electronic interface of the client device, wherein the interaction vector data structure request comprises one or more interaction vector identifiers and one or more component identifiers;
retrieve metadata associated with the one or more component identifiers, wherein the metadata comprises respective component object identifiers for the one or more component identifiers;
access a component dependency work graph structure configured to represent a relationship mapping between components of an application framework that comprises one or more server computing devices;
traverse, based on the respective component object identifiers associated with the metadata and the one or more interaction vector identifiers associated with the query provided to the search graphical control element, the component dependency work graph structure to generate one or more interaction vector data structures based on one or more dependencies between component object data associated with the respective component object identifiers; and
transmit, to the client device, one or more interaction vector interface elements configured based on the one or more dependencies identified in the one or more interaction vector data structures, wherein the one or more interaction vector interface elements are configured to graphically render the one or more interaction vector data structures via the electronic interface associated with the search graphical control element.

2. The component management system of claim 1, wherein the one or more storage devices store instructions that are operable, when executed by the one or more computers, to further cause the one or more computers to:
generate the one or more interaction vector data structures based on a mapping of the component object data associated with the respective component object identifiers.

3. The component management system of claim 2, wherein the one or more interaction vector interface elements are configured to render visualization of the mapping of the component object data associated with the respective component object identifiers via the electronic interface of the client device.

4. The component management system of claim 1, wherein the one or more storage devices store instructions that are operable, when executed by the one or more computers, to further cause the one or more computers to:
generate the one or more interaction vector data structures based on ownership data for the component object data associated with the respective component object identifiers.

5. The component management system of claim 1, wherein the one or more storage devices store instructions that are operable, when executed by the one or more computers, to further cause the one or more computers to:
generate the one or more interaction vector data structures based on timestamp data for the component object data associated with the respective component object identifiers.

6. The component management system of claim 1, wherein the one or more storage devices store instructions that are operable, when executed by the one or more computers, to further cause the one or more computers to:
generate the one or more interaction vector data structures based on one or more changes with respect to the component object data associated with the respective component object identifiers.

7. The component management system of claim 1, wherein the one or more storage devices store instructions that are operable, when executed by the one or more computers, to further cause the one or more computers to:
generate the one or more interaction vector data structures based on one or more incident events with respect to the component object data associated with the respective component object identifiers.

8. The component management system of claim 1, wherein the one or more storage devices store instructions that are operable, when executed by the one or more computers, to further cause the one or more computers to:
retrieve the metadata based on one or more component names associated with the one or more component identifiers, wherein the one or more component names correspond to input data provided to the search graphical control element.

9. The component management system of claim 1, wherein the one or more storage devices store instructions that are operable, when executed by the one or more computers, to further cause the one or more computers to:
identify one or more incomplete portions of the metadata based on the component dependency work graph structure; and
generate the one or more interaction vector interface elements based on information associated with the one or more incomplete portions of the metadata.

10. The component management system of claim 1, wherein the one or more storage devices store instructions that are operable, when executed by the one or more computers, to further cause the one or more computers to:
rank the interaction vector interface elements to generate a ranked interaction vector list interface element based on insights for respective interaction vector data structures of the interaction vector interface elements, wherein the ranked interaction vector list interface element is configured for rendering in relation to one or more interface areas via the electronic interface.

11. The component management system of claim 1, wherein the one or more storage devices store instructions that are operable, when executed by the one or more computers, to further cause the one or more computers to:
rank the interaction vector interface elements to generate a ranked interaction vector list interface element based on respective client identifiers associated with respective interaction vector data structures, wherein the ranked interaction vector list interface element is configured for rendering in relation to one or more interface areas via the electronic interface.

12. The component management system of claim 1, wherein the one or more storage devices store instructions that are operable, when executed by the one or more computers, to further cause the one or more computers to:
group two or more of the interaction vector interface elements to generate a grouped interaction vector list interface element based on a comparison between respective interaction vector data structures of the two or more of the interaction vector interface elements, wherein the grouped interaction vector list interface element is configured for rendering in relation to one or more interface areas via the electronic interface.

13. A computer-implemented method, comprising:
receiving, from a client device, an interaction vector data structure request generated based on a query provided to a search graphical control element associated with an electronic interface of the client device, wherein the interaction vector data structure request comprises one or more interaction vector identifiers and one or more component identifiers;
retrieving metadata associated with the one or more component identifiers, wherein the metadata comprises respective component object identifiers for the one or more component identifiers;
accessing a component dependency work graph structure configured to represent a relationship mapping between components of an application framework that comprises one or more server computing devices;
traversing, based on the respective component object identifiers associated with the metadata and the one or more interaction vector identifiers associated with the query provided to the search graphical control element, the component dependency work graph structure to generate one or more interaction vector data structures based on one or more dependencies between component object data associated with the respective component object identifiers; and
transmitting, to the client device, one or more interaction vector interface elements configured based on the one or more dependencies identified in the one or more interaction vector data structures, wherein the interaction vector interface elements are configured to graphically render the one or more interaction vector data structures via the electronic interface associated with the search graphical control element.

14. The computer-implemented method of claim 13, wherein the generating the one or more interaction vector data structures comprises generating the one or more interaction vector data structures based on a mapping of the component object data associated with the respective component object identifiers.

15. The computer-implemented method of claim 14, further comprising:
rendering, using the one or more interaction vector interface elements, visualization of the mapping of the component object data associated with the respective component object identifiers via the electronic interface of the client device.

16. The computer-implemented method of claim 13, wherein the traversing the component dependency work graph structure comprises generating the one or more interaction vector data structures based on ownership data for the component object data associated with the respective component object identifiers.

17. The computer-implemented method of claim 13, wherein the traversing the component dependency work graph structure comprises generating the one or more interaction vector data structures based on timestamp data for the component object data associated with the respective component object identifiers.

18. The computer-implemented method of claim 13, wherein the traversing the component dependency work graph structure comprises generating the one or more interaction vector data structures based on one or more changes with respect to the component object data associated with the respective component object identifiers.

19. The computer-implemented method of claim 13, wherein the traversing the component dependency work graph structure comprises generating the one or more interaction vector data structures based on one or more incident events with respect to the component object data associated with the respective component object identifiers.

20. The computer-implemented method of claim 13, wherein the retrieving the metadata comprises retrieving the metadata based on one or more component names associated with the one or more component identifiers, and wherein the one or more component names correspond to input data provided to the search graphical control element.

21. The computer-implemented method of claim 13, further comprising:
identifying one or more incomplete portions of the metadata based on the component dependency work graph structure; and
generating the one or more interaction vector interface elements based on information associated with the one or more incomplete portions of the metadata.

22. A computer program product, stored on a non-transitory computer-readable storage medium, comprising instructions that when executed by one or more computers cause the one or more computers to:
receive, from a client device, an interaction vector data structure request generated based on a query provided to a search graphical control element associated with an electronic interface of the client device, wherein the interaction vector data structure request comprises one or more interaction vector identifiers and one or more component identifiers;
retrieve metadata associated with the one or more component identifiers, wherein the metadata comprises respective component object identifiers for the one or more component identifiers;
access a component dependency work graph structure configured to represent a relationship mapping between components of an application framework that comprises one or more server computing devices;
traverse, based on the respective component object identifiers associated with the metadata and the one or more interaction vector identifiers associated with the query provided to the search graphical control element, the component dependency work graph structure to generate one or more interaction vector data structures based on one or more dependencies between component object data associated with the respective component object identifiers; and
transmit, to the client device, one or more interaction vector interface elements configured based on the one or more dependencies identified in the one or more interaction vector data structures, wherein the interaction vector interface elements are configured to graphically render the one or more interaction vector data structures via the electronic interface associated with the search graphical control element.

23. The computer program product of claim 22, further comprising instructions that when executed by the one or more computers cause the one or more computers to:
generate the one or more interaction vector data structures based on a mapping of the component object data associated with the respective component object identifiers.

24. The computer program product of claim 23, wherein the one or more interaction vector interface elements are configured to render visualization of the mapping of the component object data associated with the respective component object identifiers via the electronic interface of the client device.

25. The computer program product of claim 22, further comprising instructions that when executed by the one or more computers cause the one or more computers to:
generate the one or more interaction vector data structures based on ownership data for the component object data associated with the respective component object identifiers.

26. The computer program product of claim 22, further comprising instructions that when executed by the one or more computers cause the one or more computers to:
generate the one or more interaction vector data structures based on timestamp data for the component object data associated with the respective component object identifiers.

27. The computer program product of claim 22, further comprising instructions that when executed by the one or more computers cause the one or more computers to:
generate the one or more interaction vector data structures based on one or more changes with respect to the component object data associated with the respective component object identifiers.

28. The computer program product of claim 22, further comprising instructions that when executed by the one or more computers cause the one or more computers to:
generate the one or more interaction vector data structures based on one or more incident events with respect to the component object data associated with the respective component object identifiers.

29. The computer program product of claim 22, further comprising instructions that when executed by the one or more computers cause the one or more computers to:
retrieve the metadata based on one or more component names associated with the one or more component identifiers, wherein the one or more component names correspond to input data provided to the search graphical control element.

30. The computer program product of claim 22, further comprising instructions that when executed by the one or more computers cause the one or more computers to:
identify one or more incomplete portions of the metadata based on the component dependency work graph structure; and
generate the one or more interaction vector interface elements based on information associated with the one or more incomplete portions of the metadata.

* * * * *